United States Patent
Takada

(10) Patent No.: US 10,682,926 B2
(45) Date of Patent: Jun. 16, 2020

(54) SEAT DRIVE DEVICE

(71) Applicant: TOYOTA BOSHOKU KABUSHIKI KAISHA, Aichi-ken (JP)

(72) Inventor: Yoichi Takada, Aichi-ken (JP)

(73) Assignee: TOYOTA BOSHOKU KABUSHIKI KAISHA, Aichi-ken (JP)

(*) Notice: Subject to any disclaimer, the term of this patent is extended or adjusted under 35 U.S.C. 154(b) by 0 days.

(21) Appl. No.: 15/790,654

(22) Filed: Oct. 23, 2017

(65) Prior Publication Data

US 2018/0111510 A1 Apr. 26, 2018

(30) Foreign Application Priority Data

Oct. 26, 2016 (JP) ................. 2016-209713

(51) Int. Cl.
*B60N 2/02* (2006.01)
*B60N 2/06* (2006.01)
(Continued)

(52) U.S. Cl.
CPC ............ *B60N 2/0232* (2013.01); *B60N 2/06* (2013.01); *B60N 2/10* (2013.01); *B60N 2/165* (2013.01);
(Continued)

(58) Field of Classification Search
CPC ...... B60N 2/0232; B60N 2/2213; B60N 2/06; B60N 2/10; B60N 2/165; B60N 2002/0236; F16H 19/001; F16H 1/225; F16C 1/06
(Continued)

(56) References Cited

U.S. PATENT DOCUMENTS 6,050,641 A 4/2000 Benson
2006/0011005 A1* 1/2006 Wisner ................. B60N 2/0232
74/473.1
(Continued)

FOREIGN PATENT DOCUMENTS

CN A-103403391 11/2013
CN U-203460728 3/2014
(Continued)

OTHER PUBLICATIONS

Chinese Office Action dated Sep. 23, 2019 in Chinese Patent Application No. 201711019729.3 with English Translation.
(Continued)

*Primary Examiner* — Justin V Lewis
(74) *Attorney, Agent, or Firm* — Greenblum & Bernstein, P.L.C.

(57) ABSTRACT

A seat drive device includes a first operation restricting portion provided to a first transmission member and restricting a second operation member from being operated to move from an original position to an adjustment position in a state where a first operation member has been operated to move from an original position to an adjustment position and the first transmission member has been operated to move in response thereto, and a second operation restricting portion provided to a second transmission member and restricting the first operation member from being operated to move from the original position to the adjustment position in a state where the second operation member has been operated to move from the original position to the adjustment position and the second transmission member has been operated to move in response thereto.

12 Claims, 31 Drawing Sheets

(51) Int. Cl.
  *B60N 2/10* (2006.01)
  *B60N 2/16* (2006.01)
  *B60N 2/22* (2006.01)
  *F16C 1/06* (2006.01)
  *F16H 1/22* (2006.01)
  *F16H 19/00* (2006.01)

(52) U.S. Cl.
  CPC .............. *B60N 2/2213* (2013.01); *F16C 1/06* (2013.01); *F16H 1/225* (2013.01); *F16H 19/001* (2013.01); *B60N 2002/0236* (2013.01)

(58) Field of Classification Search
  USPC .......... 297/284.1, 311, 313, 330, 337, 344.1, 297/350, 353, 354.1
  See application file for complete search history.

(56) References Cited

U.S. PATENT DOCUMENTS

| | | |
|---|---|---|
| 2013/0300174 A1 | 11/2013 | Ito |
| 2013/0327166 A1 | 12/2013 | Nakamura et al. |
| 2013/0327180 A1 | 12/2013 | Shigematsu et al. |
| 2013/0327181 A1 | 12/2013 | Shigematsu et al. |
| 2014/0238188 A1 | 8/2014 | Ito |
| 2015/0321581 A1 | 11/2015 | Ito |

FOREIGN PATENT DOCUMENTS

| | | |
|---|---|---|
| CN | U-204674400 | 9/2015 |
| JP | 2013-107624 | 6/2013 |

OTHER PUBLICATIONS

German Office Action in counterpart German Application No. 102017218784.0 dated Jan. 14, 2020 (and English-language translation thereof).

Japanese Office Action in counterpart Japanese Application No. 2016-209713, dated Feb. 25, 2020 (and English-language translation thereof).

* cited by examiner

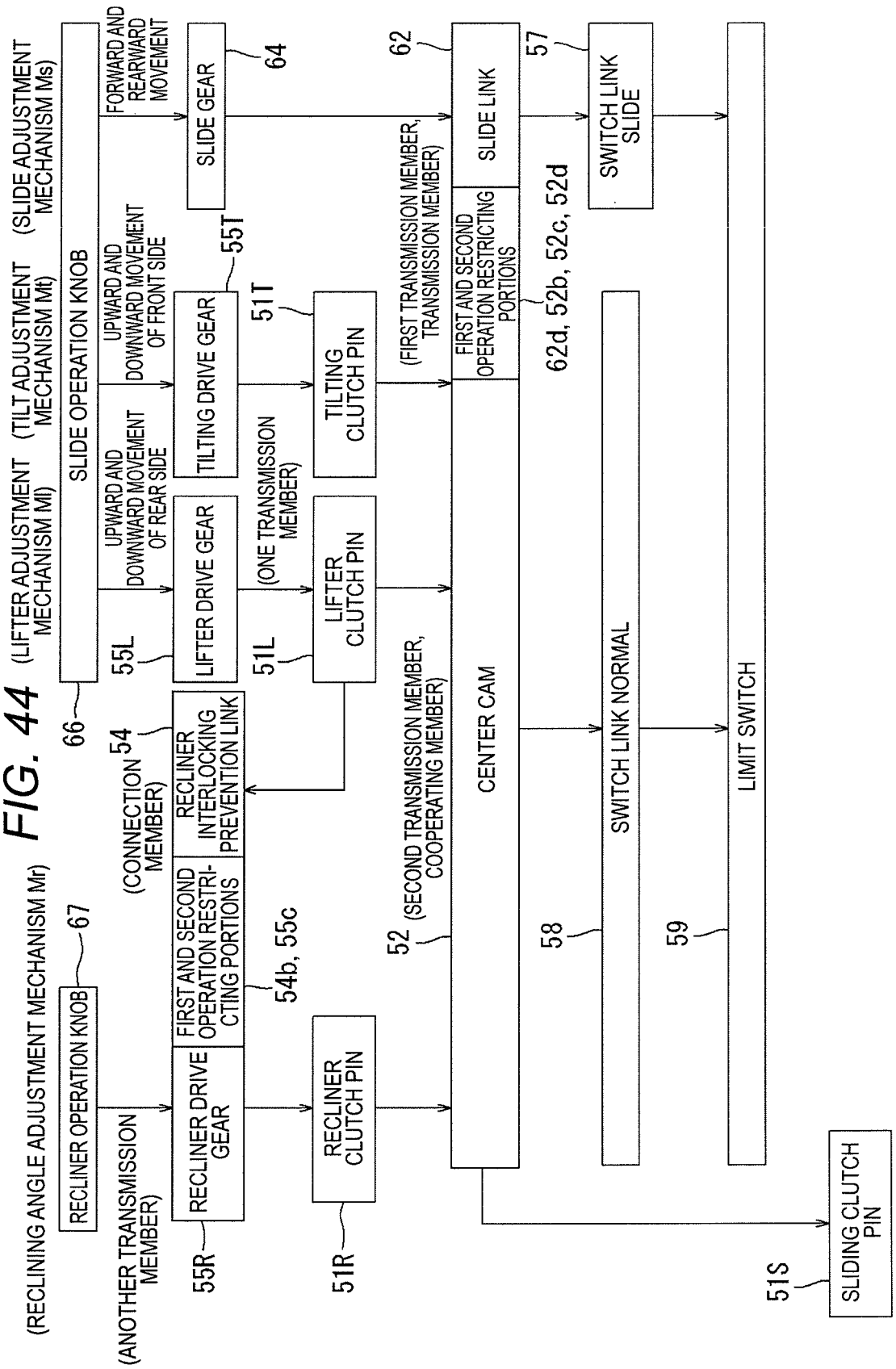

SEAT DRIVE DEVICE

CROSS-REFERENCE TO RELATED APPLICATIONS

This application claims priority from Japanese Patent Application No. 2016-209713 filed on Oct. 26, 2016, the entire contents of which are incorporated herein by reference.

TECHNICAL FIELD

The disclosure relates to a seat drive device for selectively actuating a plurality of position adjustment mechanisms by a single drive motor.

BACKGROUND

A seat drive device for selectively actuating a plurality of position adjustment mechanisms by a single drive motor is disclosed in JP-A-2013-107624. According to such a seat drive device, four position adjustments (the front-rear adjustment and up-down adjustment of a seat, the reclining angle adjustment of a seat back, and the tilt angle adjustment of a seat cushion) can be performed by using a single drive motor. Therefore, a clutch mechanism is provided in each path for distributing the output of the drive motor to each position adjustment mechanism. Then, by setting a clutch corresponding to a mechanism that performs the position adjustment to a connected state, the output of the drive motor is transmitted to the corresponding position adjustment mechanism. On the other hand, by setting a clutch corresponding to a mechanism that does not perform the position adjustment to a non-connected state, the output of the drive motor is not transmitted to the corresponding position adjustment mechanism.

Although each position adjustment mechanism is individually operated in principle, a plurality of position adjustment mechanisms can be simultaneously operated depending on the manner of operation. However, the specification of the drive motor is determined on the premise that it operates one position adjustment mechanism. Therefore, when a plurality of position adjustment mechanisms is simultaneously operated, there is a problem that the drive motor is overloaded and the operation speed is lowered.

SUMMARY

The disclosure provides a seat drive device in which a plurality of position adjustment mechanisms is selectively actuated by a single drive motor and which prevents a plurality of position adjustment mechanisms from being simultaneously actuated by making it unable to perform an operation of simultaneously actuating a plurality of position adjustment mechanisms.

According to an aspect of the disclosure, there it provided a seat drive device including: a drive motor having a single output shaft; a first position adjustment mechanism configured to receive an output of the drive motor and adjust a position of a first moving portion among a plurality of seat moving portions; a second position adjustment mechanism configured to receive an output of the drive motor and adjust a position of a second moving portion among the plurality of seat moving portions; a first operation member disposed corresponding to the first position adjustment mechanism and configured to be operated to move from an original position to an adjustment position when actuating the first position adjustment mechanism; a second operation member disposed corresponding to the second position adjustment mechanism and configured to be operated to move from an original position to an adjustment position when actuating the second position adjustment mechanism; a first clutch mechanism disposed corresponding to the first position adjustment mechanism and configured to selectively connect an output shaft of the first clutch mechanism which is connected to the first position adjustment mechanism and an input shaft of the first clutch mechanism which is configured to be rotated by the drive motor; a second clutch mechanism disposed corresponding to the second position adjustment mechanism and configured to selectively connect an output shaft of the second clutch mechanism which is connected to the second position adjustment mechanism and an input shaft of the second clutch mechanism which is configured to be rotated by the drive motor; a switch configured to energize the drive motor with a polarity corresponding to an operation direction of the first operation member or the second operation member in accordance with the operation of the first operation member or the second operation member; a first transmission member configured to transmit an operating force so as to operate and move the first clutch mechanism or the switch in response to the first operation member being operated to move from the original position to the adjustment position; a second transmission member configured to transmit an operating force so as to operate and move the second clutch mechanism or the switch in response to the second operation member being operated to move from the original position to the adjustment position; a first operation restricting portion provided to the first transmission member and restricting the second operation member from being operated to move from the original position to the adjustment position in a state where the first operation member has been operated to move from the original position to the adjustment position and the first transmission member has been operated to move in response thereto; and a second operation restricting portion provided to the second transmission member and restricting the first operation member from being operated to move from the original position to the adjustment position in a state where the second operation member has been operated to move from the original position to the adjustment position and the second transmission member has been operated to move in response thereto.

According to another aspect of the disclosure, there is provided a seat drive device provided in a seat including a plurality of position adjustment mechanisms including a first position adjustment mechanism and a plurality of second position adjustment mechanisms, the seat drive device including: a drive motor having a single output shaft; a plurality of operation members individually disposed corresponding to the plurality of position adjustment mechanisms and configured to be operated when actuating the plurality of position adjustment mechanisms, respectively, the plurality of operation members including: a first operation member configured to be operated to move from an original position to an adjustment position when actuating the first position adjustment mechanism; and a plurality of second operation members configured to be individually operated to move from an original position to an adjustment position when actuating the plurality of second position adjustment mechanisms, respectively; a plurality of clutch mechanisms individually disposed corresponding to the plurality of position adjustment mechanisms and configured to selectively connect each output shaft of the plurality of clutch mechanisms which is connected to each of the plurality of position adjustment mechanisms and each input shaft of the plurality of clutch mechanisms which is configured to be rotated by the drive motor, the plurality of clutch mechanisms including: a first clutch mechanism connected to the first position adjustment mechanism and causing the output shaft of the first clutch mechanism which is connected to the first position adjustment mechanism and the input shaft of the first clutch mechanism to be normally in a connected state; and a plurality of second clutch mechanisms respectively connected to the plurality of second position adjustment mechanisms and causing each output shaft of the plurality of second clutch mechanisms which is connected to each of the plurality of second position adjustment mechanisms and each input shaft of the plurality of second clutch mechanisms to be normally in a non-connected state; a switch configured to energize the drive motor with a polarity corresponding to an operation direction of any one of the plurality of operation members in accordance with the operation of the any one of the plurality of operation members, a first clutch driving unit for switching the output shaft and the input shaft of the first clutch mechanism to a non-connected state; a plurality of second clutch driving unit for individually switching each output shaft and each input shaft of each of the plurality of second clutch mechanisms to a connected state; a cooperating member configured to transmit an operating force of operating each of the plurality of second operation members, which has been transmitted to each of the plurality of second clutch driving unit, to the first clutch driving unit; a transmission member configured to transmit an operating force so as to operate and move the switch in accordance with the first operation member being operated to move from the original position to the adjustment position; a first operation restricting portion provided to the transmission member and restricting any one of the second operation members from being operated to move from the original position to the adjustment position in a state where the first operation member has been operated to move from the original position to the adjustment position and the transmission member has been operated to move in response thereto; and a second operation restricting portion provided to the cooperating member and restricting the first operation member from being operated to move from the original position to the adjustment position in a state where the second operation member has been operated to move from the original position to the adjustment position and the cooperating member has been operated to move in response thereto.

According to another aspect of the disclosure, there is provided a seat drive device including: a drive motor having a single output shaft; a lifter adjustment mechanism configured to receive an output of the drive motor and adjusting a height of a seat from a floor; a reclining angle adjustment mechanism configured to receive an output of the drive motor and adjust an inclination angle of a seat back to a seat cushion; a first operation knob disposed corresponding to the lifter adjustment mechanism and configured to be operated to move from an original position to an adjustment position when actuating the lifter adjustment mechanism; a second operation knob disposed corresponding to the reclining angle adjustment mechanism and configured to be operated to move from an original position to an adjustment position when actuating the reclining angle adjustment mechanism; a lifter clutch mechanism disposed corresponding to the lifter adjustment mechanism and configured to selectively connect an output shaft of the lifter clutch mechanism which is connected to the lifter adjustment mechanism and an input shaft of the first clutch mechanism which is configured to be rotated by the drive motor; a recliner clutch mechanism disposed corresponding to the reclining angle adjustment mechanism and configured to selectively connect an output shaft of the recliner clutch mechanism which is connected to the reclining angle adjustment mechanism and an input shaft of the recliner clutch mechanism which is configured to be rotated by the drive motor; a switch configured to energize the drive motor with a polarity corresponding to an operation direction of the first operation knob or the second operation knob in accordance with the operation of the first operation knob or the second operation knob; a first transmission member configured to transmit an operating force so as to operate and move the lifter clutch mechanism or the switch in response to the first operation knob being operated to move from the original position to the adjustment position; a second transmission member configured to transmit an operating force so as to operate and move the recliner clutch mechanism or the switch in response to the second operation knob being operated to move from the original position to the adjustment position; a first operation restricting portion provided to the first transmission member and restricting the second operation knob from being operated to move from the original position to the adjustment position in a state where the first operation knob has been operated to move from the original position to the adjustment position and the first transmission member has been operated to move in response thereto; and a second operation restricting portion provided to the second transmission member and restricting the first operation knob from being operated to move from the original position to the adjustment position in a state where the second operation knob has been operated to move from the original position to the adjustment position and the second transmission member has been operated to move in response thereto, wherein the first operation knob and the second operation knob are disposed adjacent to each other.

BRIEF DESCRIPTION OF DRAWINGS

FIG. 44 is a flowchart of an operation of the seat drive device according to the first embodiment.

DETAILED DESCRIPTION

FIGS. 1 to 4 show a first embodiment of the disclosure. The first embodiment represents an example in which the seat drive device of the disclosure is applied to a vehicle front seat (hereinafter, simply referred to as a "seat") 6. In each drawing, respective directions in the state where the seat 6 is mounted to a vehicle are indicated by arrows. In the following, the descriptions relating to the directions will be made on the basis of these directions.

Figure 1:
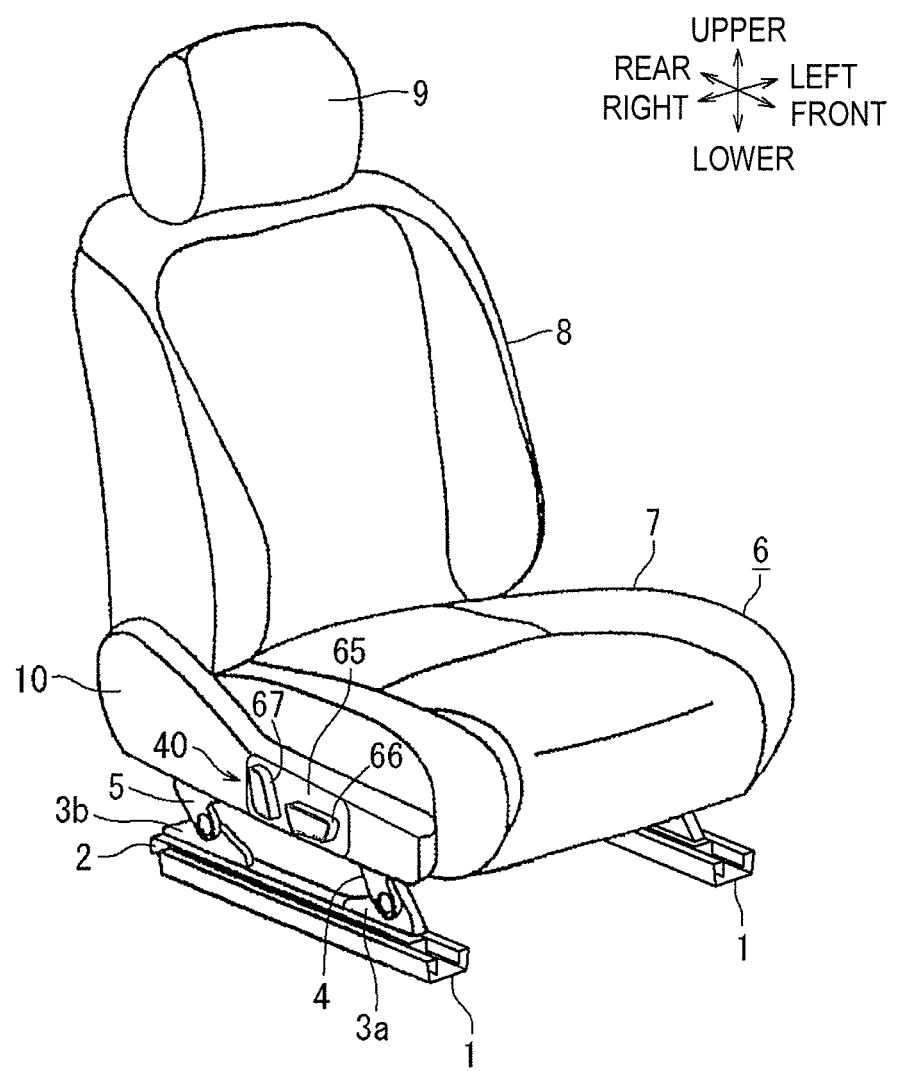
FIG. 1 is a perspective view of a vehicle front seat to which a seat drive device according to a first embodiment of the disclosure is applied.

FIG. 1 shows an appearance of the seat 6. In the seat 6, a seat back 8 forming a backrest is fixed to the rear side of a seat cushion 7 forming a seating part so as to freely rotate back and forth. Therefore, a recliner (not shown) for adjusting a reclining angle of the seat back 8 is provided at a hinge portion between a rear portion of the seat cushion 7 and a lower portion of the seat back 8.

A headrest 9 for supporting a head part of a seated occupant from the rear is provided at an upper end portion of the seat back 8. Further, a right portion of the seat cushion 7 and a lower portion of the seat back 8 are covered with a side shield 10. A driving device 40 for the seat drive device is accommodated in the side shield 10. The driving device 40 can adjust the seating posture of an occupant seated on the seat 6 according to the preference of the occupant. A slide operation knob 66 and a recliner operation knob 67 forming an operation member of the driving device 40 are exposed to the outside of the side shield 10 so that they can be operated by the seated occupant.

The seat 6 is fixed to a vehicle floor so as to freely move back and forth. Therefore, on the vehicle floor, a pair of lower rails 1 is fixed to the lower sides of both left and right end portions of the seat cushion 7. Then, upper rails 2 are respectively fitted into the lower rails 1 and are slidable in a front and rear direction with respect to the lower rails 1. Brackets 3a, 3b are fixed on each of the upper rails 2, respectively. The seat cushion 7 is fixed on the brackets 3a, 3b via a front link 4 and a rear link 5, respectively. The front link 4 and the rear link 5 are tiltable in the front and rear direction with respect to the brackets 3a, 3b. Therefore, as will be described later, the height of the seat 6 from the vehicle floor can be adjusted by the angle adjustment of the front link 4 and the rear link 5.

Figure 2:
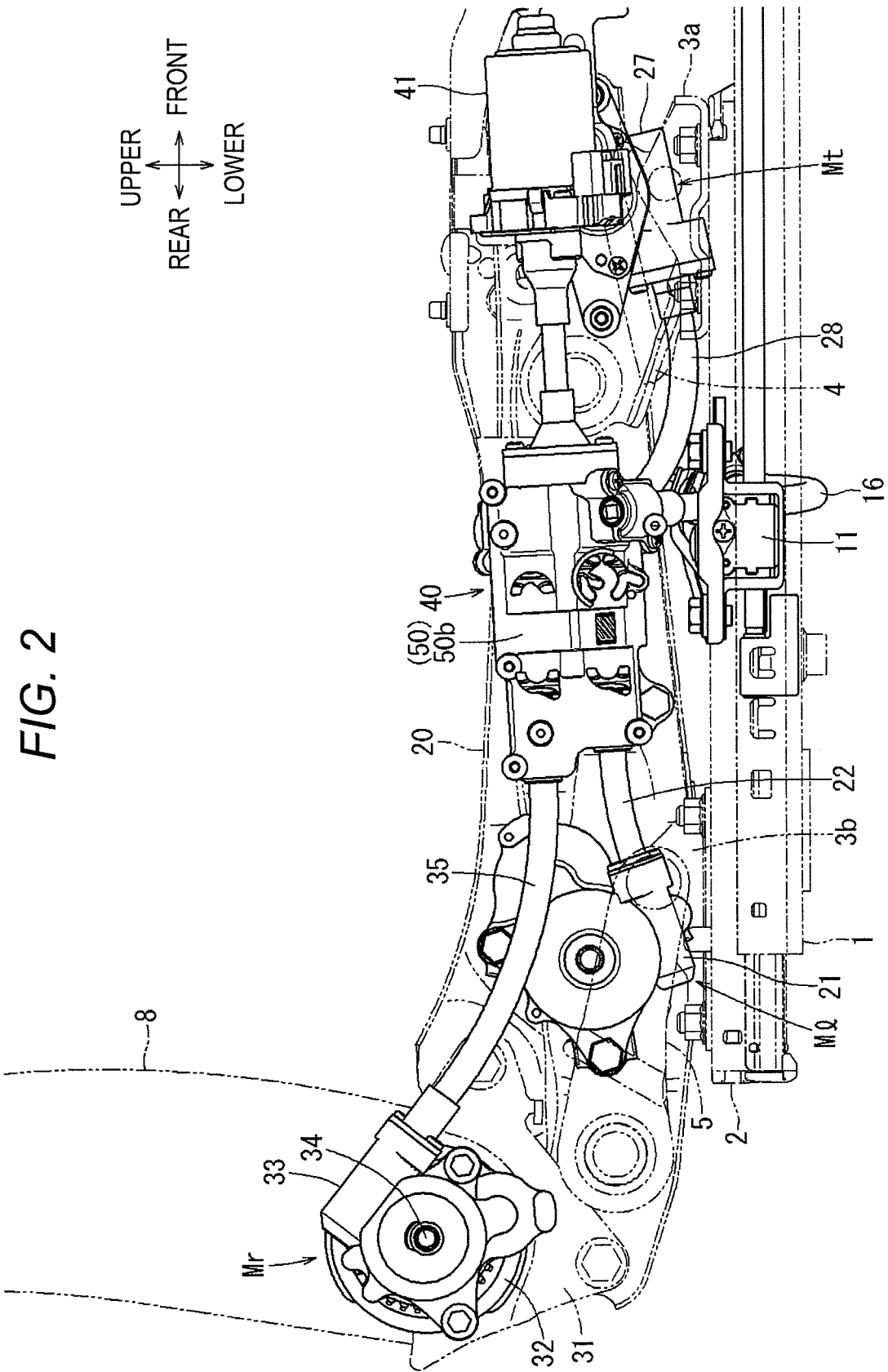
FIG. 2 is an enlarged front view of a main part of the first embodiment.
Figure 3:
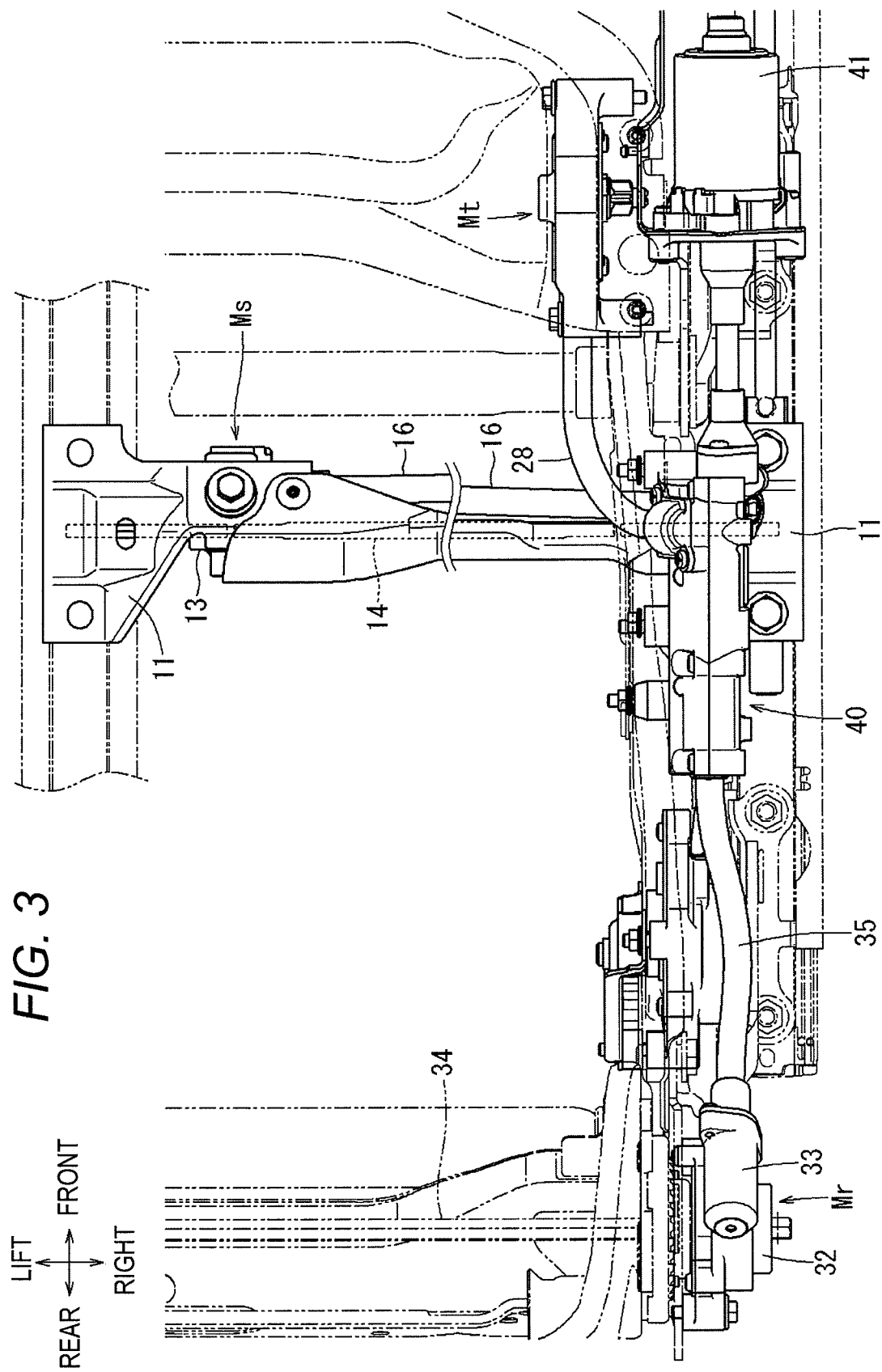
FIG. 3 is an enlarged plan view of a main part of the first embodiment.
Figure 4:
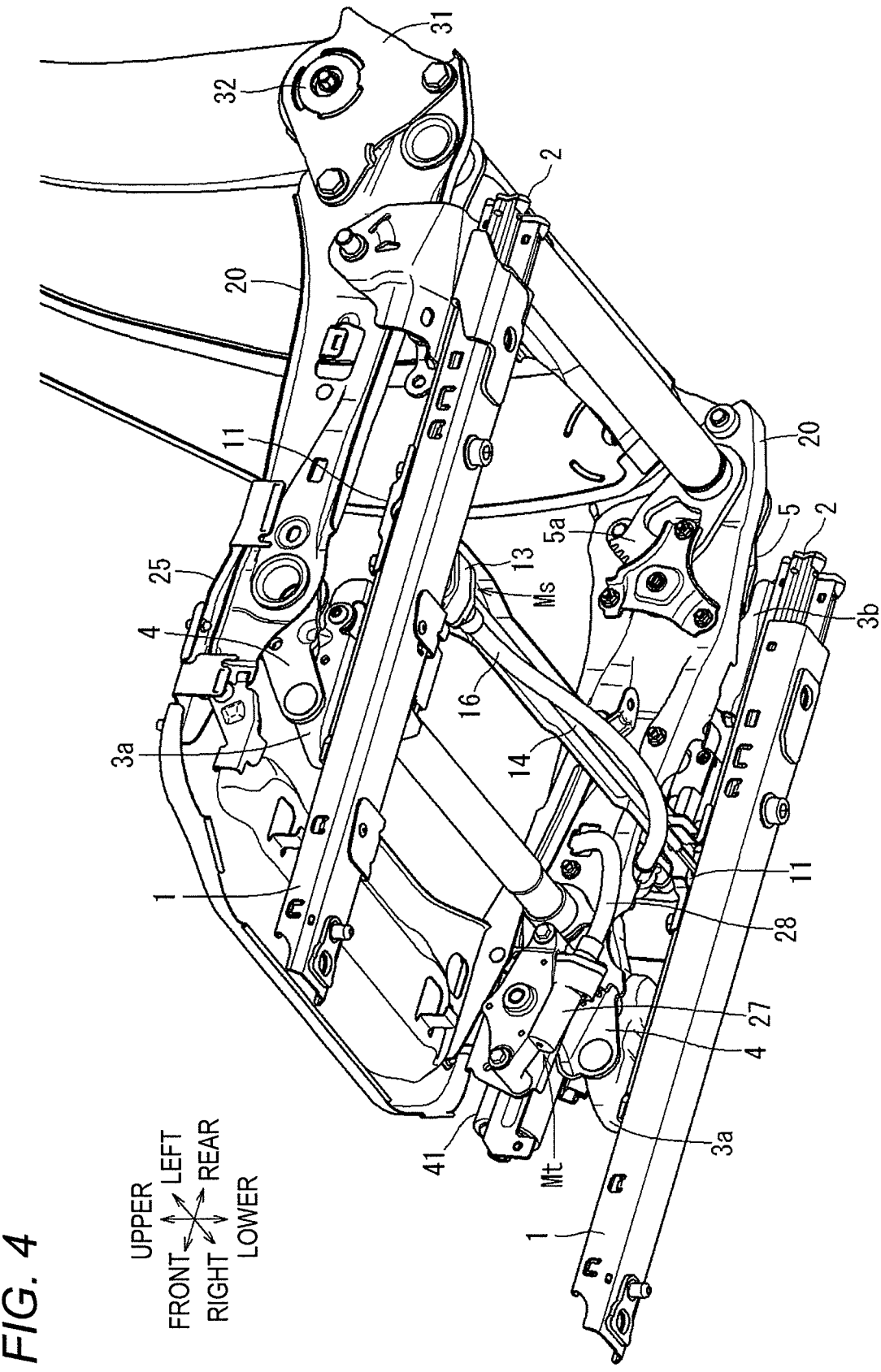
FIG. 4 is an enlarged perspective view of a main part of the first embodiment.

FIGS. 2 to 4 show a lower framework structure of the seat 6 together with the driving device 40. A sliding nut member 11 is rotatably fixed in each of the left and right lower rails 1. Each of the sliding nut members 11 is provided with a female screw penetrating in the front and rear direction. On the other hand, a sliding lead screw (not shown) extending along the front and rear direction of each upper rail 2 is fixed in each of the left and right upper rails 2. A male screw is formed on an outer periphery of the sliding lead screw and is screwed with the female screw of the sliding nut member 11. Although not shown, a bevel gear is formed on an outer peripheral side of each sliding nut member 11, and a bevel gear for direction change meshing with each bevel gear is provided. Each bevel gear for direction change is fixed to each end portion of a sliding connection rod 14 and is connected to each other. At least the end portions of the sliding connection rod 14 have a polygonal column shape.

A sliding gear box 13 is coupled to a portion between both ends of the sliding connection rod 14. Bevel gears (not shown) meshing with each other are incorporated in the sliding gear box 13. One of the bevel gears is fixed so as to rotate synchronously with the sliding connection rod 14, and the other thereof is fixed so as to be rotated by a sliding torque cable 16 (to be described later).

Therefore, when the sliding torque cable 16 is rotated, the rotation thereof is transmitted to the sliding connection rod 14 via the sliding gear box 13. Then, the rotation of the sliding connection rod 14 is transmitted to the sliding nut member 11. When the sliding nut member 11 is rotated, the rotation of the sliding nut member is converted into a forward and rearward movement by the sliding lead screw screwed to the sliding nut member 11, so that the sliding connection rod 14 moves in the front and rear direction. Here, the sliding nut member 11, the sliding lead screw, the sliding gear box 13, and the sliding connection rod 14 constitute a slide adjustment mechanism Ms as a sliding position adjustment mechanism, together with the lower rail 1 and the upper rail 2. The slide adjustment mechanism Ms adjusts the position in the front and rear direction of the seat 6 with respect to the vehicle floor.

Lower ends of the front link 4 on each side are pivotably fixed to the bracket 3a and upper ends thereof are pivotally fixed to a front end portion of a side frame 20 constituting a framework of the seat cushion 7. Further, lower ends of the rear link 5 on each side are pivotably fixed to the bracket 3b and upper ends thereof are pivotally fixed to a rear end portion of the side frame 20. Therefore, the upper rail 2, the brackets 3a, 3b, the front link 4, the rear link 5, and the side frame 20 constitute a four-bar linkage.

On the front side of the right rear link 5, a sector gear portion 5a widening in a substantially fan shape about a rotation shaft on the side of the side frame 20 is formed. Specifically, the sector gear portion 5a is separated in a right and left direction with respect to the rear link 5 and is integrated with the rotation shaft. Further, a lifter gear box 21 is provided on the side surface of the side frame 20 and located adjacent to the right rear link 5. The lifter gear box 21 incorporates a speed reduction mechanism including a worm (not shown) and a worm wheel (not shown). A lifter pinion (not shown) is coaxially fixed to the worm wheel. The lifter pinion is meshed with the sector gear portion 5a. Then, the worm is fixed to an end portion of a lifter torque cable 22 extending forward of the lifter gear box 21.

When the lifter torque cable 22 is rotated, the rotation of the lifter torque cable 22 is transmitted to the worm, decelerated by the worm wheel, and transmitted to the lifter pinion. The rotation of the lifter pinion is transmitted to the rear link 5 via the sector gear portion 5a, so that the rear link 5 rotates around its upper end. Thereby, the front link 4 and the rear link 5 constituting a four-bar linkage rotate about fixed points on the side of the brackets 3a, 3b, so that the side frame 20 moves up and down with respect to the brackets 3a, 3b. Here, the front link 4, the rear link 5, and the lifter gear box 21 constitute a lifter adjustment mechanism Ml as a lifter position adjustment mechanism, together with the brackets 3a, 3b and the side frame 20. The lifter adjustment mechanism Ml adjusts the height of the seat 6 from the vehicle floor.

On the front side of the center portions in the front and rear direction of the right and left side frames 20, a tilt arm 25 made of a plate material is respectively fixed so as to freely rotate around its rear end portion. An upper end of a tilt link (not shown) is rotatably fixed to a front end portion of each tilt arm 25, and a lower end of the tilt link is rotatably fixed coaxially with the upper end of the front link 4.

On the front side of the right tilt link, a sector gear portion (not shown) widening in a substantially fan shape about a rotation shaft at its lower end is formed. Further, a tilting gear box 27 is provided on the side surface of the side frame 20 and is located adjacent to the right tilt link. The tilting gear box 27 incorporates a speed reduction mechanism including a worm (not shown) and a worm wheel (not shown). A tilting pinion is coaxially fixed to the worm wheel. The tilting pinion is meshed with the sector gear portion. Then, the worm is fixed to an end portion of a tilting torque cable 28 extending rearward of the tilting gear box 27.

When the tilting torque cable 28 is rotated, the rotation of the tilting torque cable 28 is transmitted to the worm, decelerated by the worm wheel, and transmitted to the tilting pinion. The rotation of the tilting pinion is transmitted to the tilt link via the sector gear portion, so that the tilt link rotates around its lower end. Thereby, the tilt arm 25 rotates around its rear end portion, so that the front end portion thereof moves up and down. Therefore, an inclination angle of the tilt arm 25 to the side frame 20 increases or decreases. Here, the tilt link and the tilting gear box 27 constitute a tilt adjustment mechanism Mt as a tilting position adjustment mechanism, together with the tilt arm 25 and the side frame 20. The tilt adjustment mechanism Mt adjusts the height of the front portion of the seat cushion 7 to the rear portion.

A recliner plate 31 made of a plate material is fixed to a rear end portion of the side frame 20 on each side. A lower end portion of the seat back 8 is coupled to the recliner plate 31 via a substantially disc-shaped recliner 32. The recliner 32 constitutes a well-known hypocycloid reducer. That is, although not shown, the recliner 32 includes a first disc, a second disc, a wedge member, and a cam shaft and the like. The first disc has an internal gear and is fixed to the recliner plate 31. The second disc has an external gear which has a smaller number of teeth than that of the internal gear and is meshed with the internal gear. The wedge member maintains the eccentric state of the internal gear and the external gear so as to engage these gears. The cam shaft is disposed coaxially with the first disc (internal gear), pivotally supports the second disc and moves the wedge member. Then, the recliner 32 is fixed to the seat back 8 at the second disc. In the recliner 32, the movement of the wedge member according to the rotation of the cam shaft causes the second disc to revolve while maintaining the meshed state of the internal gear and the external gear. In this way, the rotation of the cam shaft is decelerated as the number of rotation of the second disc at the time of this revolution. Then, the rotation of the second disc to the first disc causes the seat back 8 to be pivoted (tilted) with respect to the seat cushion 7.

A recliner gear box 33 is fixed to an outer side of the recliner plate 31 on the right side. This recliner gear box 33 incorporates a speed reduction mechanism including a worm (not shown) and a worm wheel (not shown). The worm wheel is connected so as to rotate integrally with a polygonal columnar recliner connecting rod 34 which has an axis extending in a seat width direction and is bridged between the recliners 32 on both sides. This recliner connecting rod 34 penetrates the recliners 32 on both sides and is connected so as to rotate integrally with the cam shafts thereof. On the other hand, the worm is fixed to an end portion of a recliner torque cable 35 extending forward of the recliner gear box 33.

Therefore, when the recliner torque cable 35 is rotated, the rotation thereof is decelerated between the worm that is an input side of the recliner gear box 33 and the worm wheel that is an output side thereof and is transmitted to the recliner connecting rod 34. Then, the rotation of the recliner connecting rod 34 is transmitted to the cam shafts of the recliners 32. In this way, in the manner described above, the second disc of the recliner 32 is rotated with respect to the first disc, and the seat back 8 is pivoted (tilted) with respect to the seat cushion 7. Here, the recliner 32, the recliner gear box 33 and the recliner connecting rod 34 constitute a reclining angle adjustment mechanism Mr as a recliner position adjustment mechanism, together with the recliner plate 31 and the seat back 8. The reclining angle adjustment mechanism Mr adjusts an inclination angle of the seat back 8 to the seat cushion 7.

As described above, the present embodiment is applied to a so-called 8-way power seat in which the position of the seat can be adjusted in a forward direction and a reverse direction in each of the slide adjustment mechanism Ms, the lifter adjustment mechanism Ml, the tilt adjustment mechanism Mt and the reclining angle adjustment mechanism Mr. Each seat moving portion on the seat 6, which is adjusted by each of these adjustment mechanisms Ms, Ml, Mt, Mr, corresponds to the seat moving portion in the disclosure. Particularly, the seat moving portion adjusted by the slide adjustment mechanism Ms corresponds to the first moving portion in the disclosure, and the seat moving portions adjusted by the lifter adjustment mechanism Ml, the tilt adjustment mechanism Mt and the reclining angle adjustment mechanism Mr correspond to the second moving portion in the disclosure.

The driving device 40 is fixed to an intermediate portion in the front and rear direction of the right side frame 20 located between the lifter gear box 21 and the tilting gear box 27. The driving device 40 includes a drive motor 41 having a single output shaft. The output shaft of the drive motor 41 is connected to the sliding torque cable 16, the lifter torque cable 22, the tilting torque cable 28 and the recliner torque cable 35 via clutch mechanism as described later. Therefore, the operations of the slide adjustment mechanism Ms, the lifter adjustment mechanism Ml, the tilt adjustment mechanism Mt and the reclining angle adjustment mechanism Mr can be adjusted by a single drive motor 41.

Figure 5:
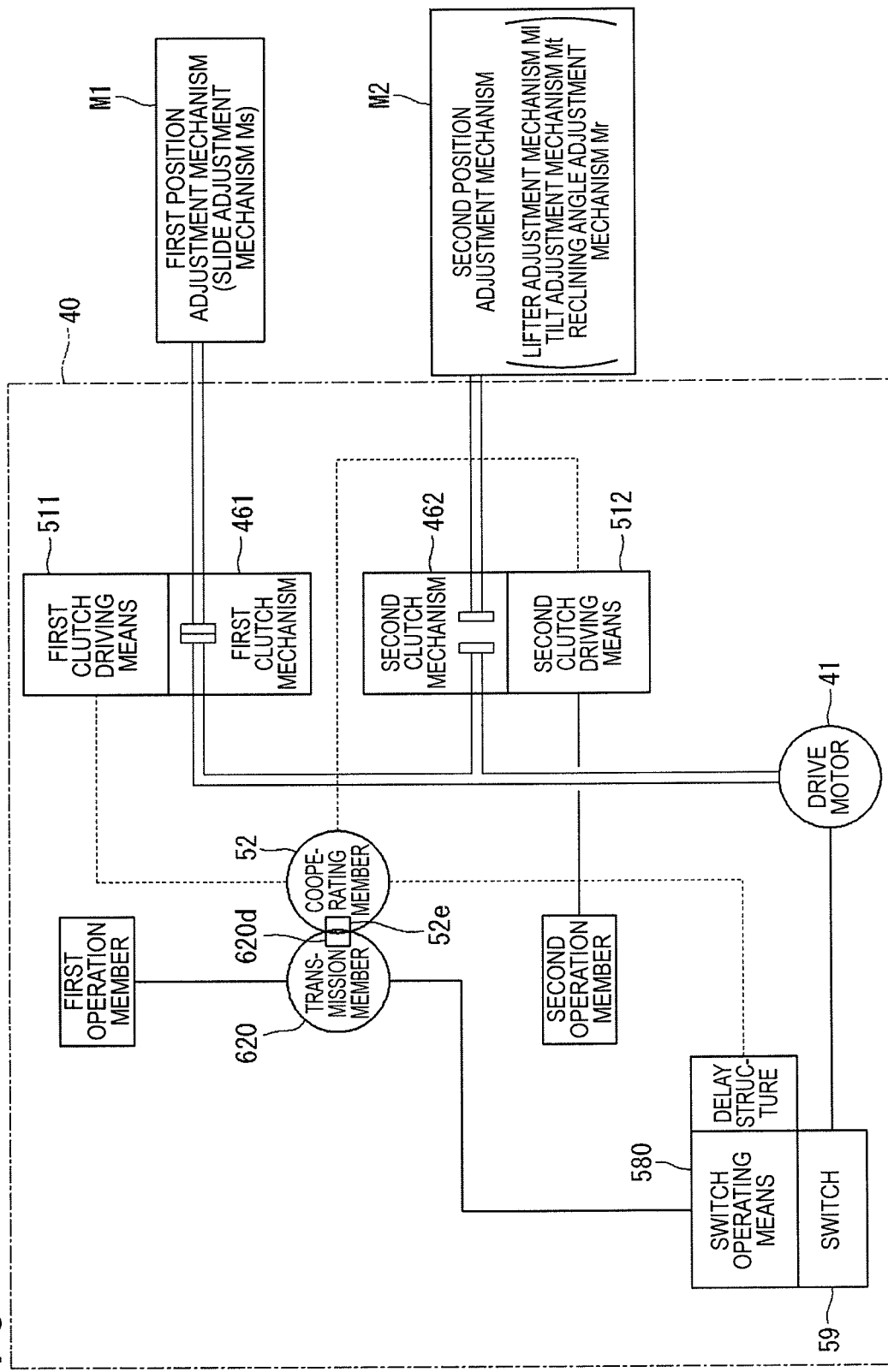
FIG. 5 is a schematic system explanatory view of the first embodiment.

FIG. 5 shows a schematic system explanatory view of the seat drive device including the driving device 40. Here, a first position adjustment mechanism M1 is a position adjustment mechanism with a relatively high adjustment frequency in the 8-way power seat. Specifically, the first position adjustment mechanism M1 refers to the slide adjustment mechanism Ms. Further, a second position adjustment mechanism M2 is a position adjustment mechanism other than the first position adjustment mechanism M1 in the 8-way power seat. Specifically, the second position adjustment mechanism M2 refers to the lifter adjustment mechanism Ml, the tilt adjustment mechanism Mt and the reclining angle adjustment mechanism Mr. Therefore, although only one second position adjustment mechanism M2 is shown herein, actually, three position adjustment mechanisms are provided in parallel to each other.

The first position adjustment mechanism M1 is connected to an output shaft of the drive motor 41 via a first clutch mechanism 461. Further, the second position adjustment mechanism M2 is connected to the output shaft of the drive motor 41 via a second clutch mechanism 462. The first clutch mechanism 461 is normally in a connected state, and the second clutch mechanism 462 is normally in a non-connected state. The first clutch mechanism 461 includes a first clutch driving unit 511 adjacent thereto. When the first clutch driving unit 511 is actuated, the first clutch mechanism 461 is switched to a non-connected state. Further, the second clutch mechanism 462 includes a second clutch driving unit 512 adjacent thereto. When the second clutch driving unit 512 is actuated, the second clutch mechanism 462 is switched to a connected state.

The second clutch driving unit 512 is actuated by an operation from an original position to an adjustment position of the second operation member which is operated so as to actuate the second position adjustment mechanism M2. Further, the first clutch driving unit 511 is actuated by the second clutch driving unit 512 via the cooperating member 52. Therefore, when the second operation member is operated, the second clutch driving unit 512 is actuated and the first clutch driving unit 511 is also actuated. As a result, when the second operation member is operated, the second clutch mechanism 462 is switched to the connected state and at the same time the first clutch mechanism 461 is switched to the non-connected state.

When the second clutch driving unit 512 is actuated, the switch operating unit 580 is actuated via a delay structure, and a limit switch 59 is switched in accordance with the operation direction of the second operation member. As a result, the drive motor 41 is actuated and the second position adjustment mechanism M2 is actuated in accordance with the operation direction of the second operation member via the second clutch mechanism 462. At this time, since the first clutch mechanism 461 is brought into the non-connected state as described above, the first position adjustment mechanism M1 is not operated. Further, in the switching of the limit switch 59, the switch operating unit 580 is actuated by the second clutch driving unit 512 via the delay structure, and therefore, the drive motor 41 is actuated after the second clutch mechanism 462 is brought into the connected state and the first clutch mechanism 461 is brought into the non-connected state. Thus, it is possible to prevent a defect that the drive motor 41 is actuated before the second clutch mechanism 462 is switched to the connected state and the first clutch mechanism 461 is switched to the non-connected state.

Further, as described above, the operating force of the second operation member, which has been transmitted to the second clutch driving unit 512, is transmitted to the first clutch driving unit 511 via the cooperating member 52. Therefore, the actuation of bringing the second clutch mechanism 462 into the connected state and the actuation of bringing the first clutch mechanism 461 into the non-connected state can be performed in cooperation with each other only by operating the second operation member.

The first operation member operated to actuate the first position adjustment mechanism M1 is coupled so as to directly actuate the switch operating unit 580 without a delay structure. Therefore, the limit switch 59 is switched in accordance with the operation direction of the first operation member. Meanwhile, the first operation member and the first clutch driving unit 511 are not coupled. Therefore, when the first operation member is operated from the original position to the adjustment position, the limit switch 59 is switched by the switch operating unit 580 and the drive motor 41 is actuated. The output of the drive motor 41 actuates the first position adjustment mechanism M1 via the first clutch mechanism 461 which is normally in the connected state.

In this manner, when the first position adjustment mechanism M1, which is frequently used, is actuated, the first clutch driving unit 511 is not actuated and the first clutch mechanism 461 is kept in the connected state. Therefore, even when the first position adjustment mechanism M1 is adjusted with high frequency, the deterioration of the first clutch mechanism 461 corresponding to the first position adjustment mechanism M1 can be suppressed.

A transmission member 620 is interposed in a path through which the operating force of the first operation member is transmitted to the switch operating unit 580. The transmission member 620 is disposed adjacent to the cooperating member 52. Operation restricting portions are respectively provided on mutually adjacent portions of the transmission member 620 and the cooperating member 52. The operation restricting portion is constituted by a first operation restricting portion 620d provided at a portion of the transmission member 620 adjacent to the cooperating member 52 and a second operation restricting portion 52e provided at a portion of the cooperating member 52 adjacent to the transmission member. When the first operation member is operated, and thus, the transmission member 620 is moved, the first operation restricting portion 620d of the transmission member 620 is located within a movement range of the second operation restricting portion 52e as the cooperating member 52 moves. Therefore, the movement of the cooperating member 52 is restricted by the first operation restricting portion 620d. As a result, the operation of the second operation member connected to the cooperating member 52 is restricted. Further, when the second operation member is operated, and thus, the cooperating member 52 is moved, the second operation restricting portion 52e of the cooperating member 52 is located within a movement range of the first operation restricting portion 620d as the transmission member 620 moves. Therefore, the movement of the transmission member 620 is restricted by the second operation restricting portion 52e. As a result, the operation of the first operation member connected to the transmission member 620 is restricted.

Figure 6:
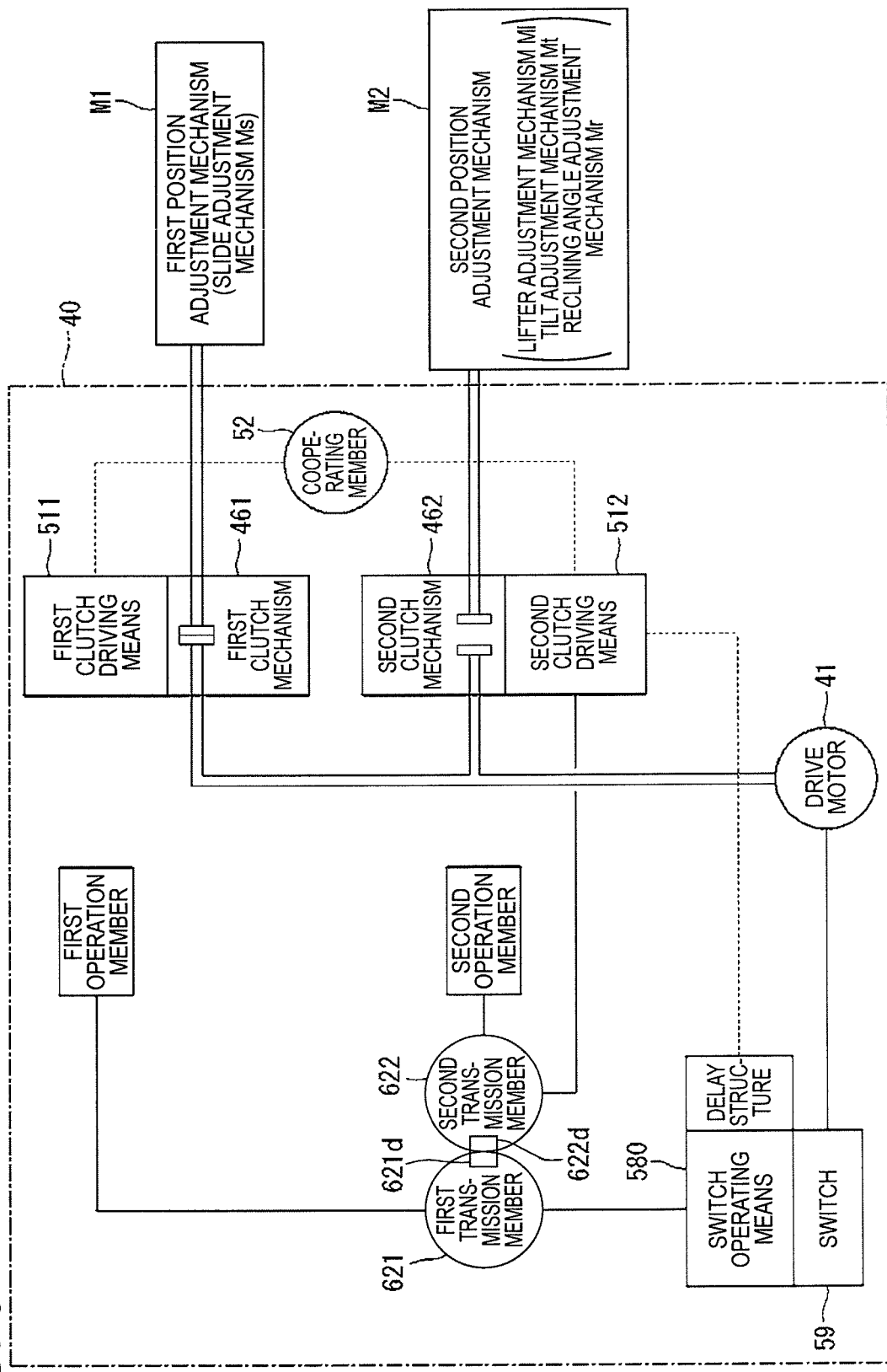
FIG. 6 is a schematic system explanatory view of a second embodiment of the disclosure.

FIG. 6 shows a schematic system explanatory view of a seat drive device according to a second embodiment. In the second embodiment, a first transmission member 621 is interposed in a path through which the operating force of the first operation member is transmitted to the switch operating unit 580. Further, a second transmission member 622 is interposed in a path through which the operating force of the second operation member is transmitted to the second clutch driving unit 512. A first operation restricting portion 621d and a second operation restricting portion 622d are respectively provided on mutually adjacent portions of the first transmission member 621 and the second transmission member 622. The first operation restricting portion 621d is provided on a portion of the first transmission member 621 adjacent to the second transmission member 622, and the second operation restricting portion 622d is provided on a portion of the second transmission member 622 adjacent to the first transmission member 621. The first operation restricting portion 621d and the second operation restricting portion 622d are provided in place of the first operation restricting portion 620d and the second operation restricting portion 52e provided on the mutually adjacent portions of the transmission member 620 and the cooperating member 52 in the first embodiment.

The functions of the first operation restricting portion 621d and the second operation restricting portion 622d in the second embodiment are completely the same as those of the first operation restricting portion 620d and the second operation restricting portion 52e in the first embodiment.

Figure 7:
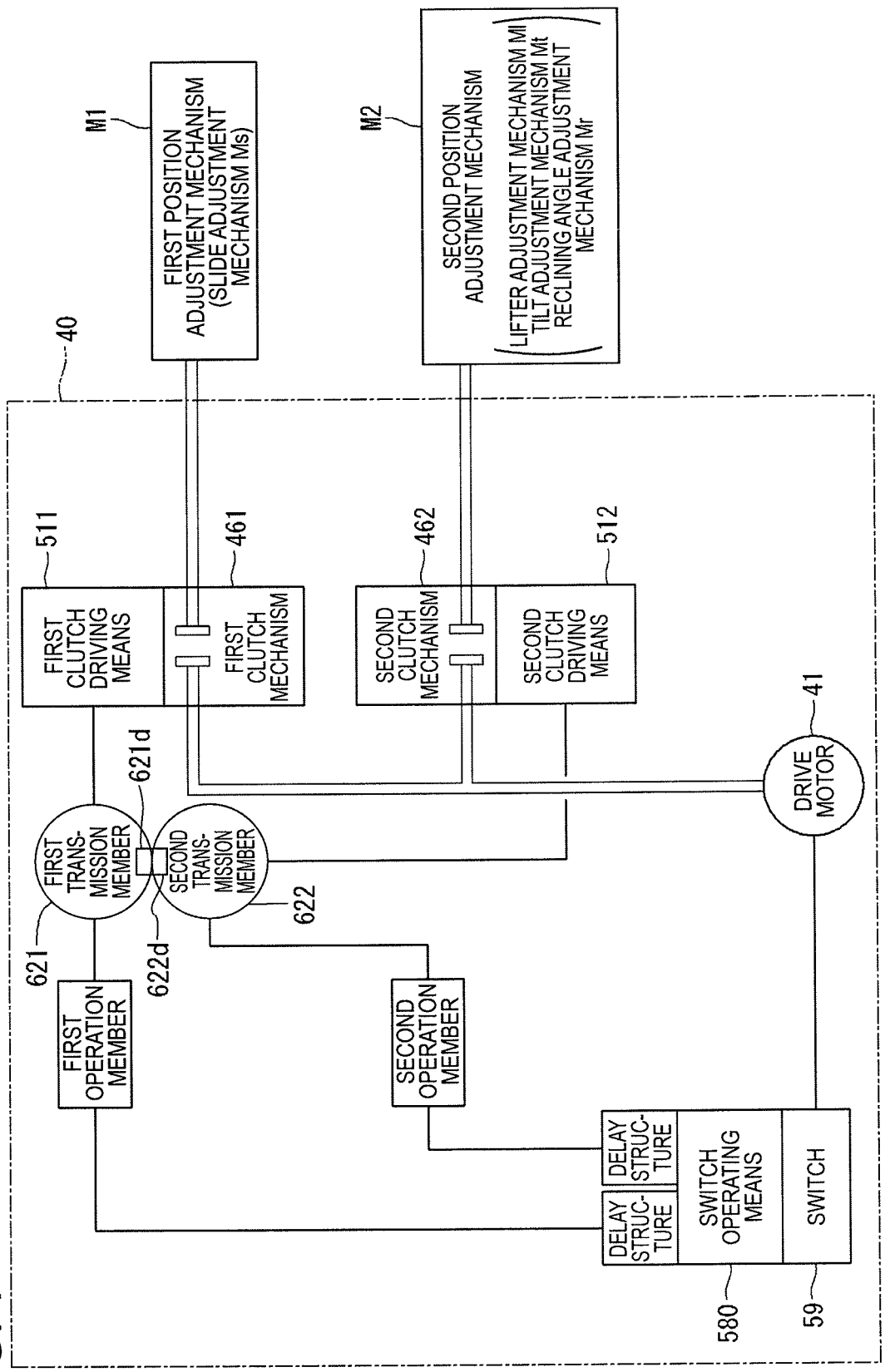
FIG. 7 is a schematic system explanatory view of a third embodiment of the disclosure.

FIG. 7 shows a schematic system explanatory view of a seat drive device according to a third embodiment. In the third embodiment, the first clutch mechanism 461 is normally in a non-connected state. Therefore, the cooperating member 52 provided in the first and second embodiments is not provided. Then, the first operation member is configured to transmit its operating force to the first clutch driving unit 511 and the switch operating unit 580. However, the operating force of the first operation member is transmitted to the switch operating unit 580 via a delay structure. Further, the second operation member is configured to transmit its operating force to the second clutch driving unit 512 and the switch operating unit 580. However, the operating force of the second operation member is transmitted to the switch operating unit 580 via a delay structure.

On the other hand, the first transmission member 621 is interposed in a path through which the operating force of the first operation member is transmitted to the first clutch driving unit 511. Further, the second transmission member 622 is interposed in a path through which the operating force of the second operation member is transmitted to the second clutch driving unit 512. The first operation restricting portion 621d and the second operation restricting portion 622d are respectively provided on the mutually adjacent portions of the first transmission member 621 and the second transmission member 622. The first operation restricting portion 621d is provided on a portion of the first transmission member 621 adjacent to the second transmission member 622, and the second operation restricting portion 622d is provided on a portion of the second transmission member 622 adjacent to the first transmission member 621. The first operation restricting portion 621d and the second operation restricting portion 622d are provided in place of the first operation restricting portion 620d and the second operation restricting portion 52e provided in the mutually adjacent portions of the transmission member 620 and the cooperating member 52 in the first embodiment.

The functions of the first operation restricting portion 621d and the second operation restricting portion 622d in the third embodiment are completely the same as those of the first operation restricting portion 620d and the second operation restricting portion 52e in the first embodiment.

Figure 8:
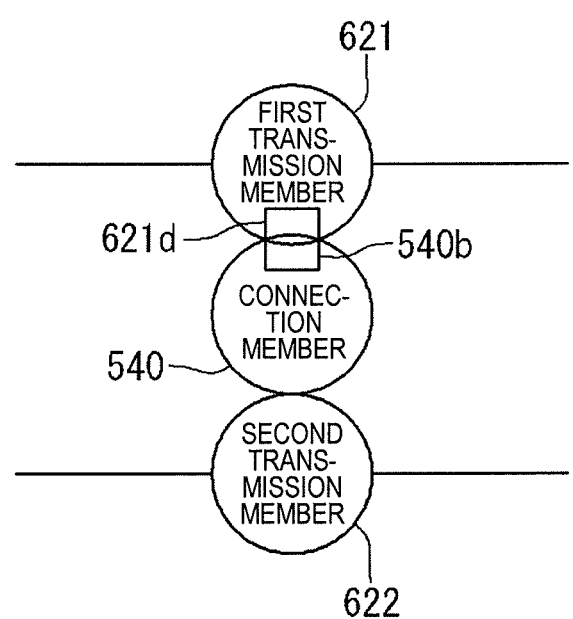
FIG. 8 is a schematic system explanatory view of a fourth embodiment of the disclosure, showing only a characteristic portion.
Figure 9:
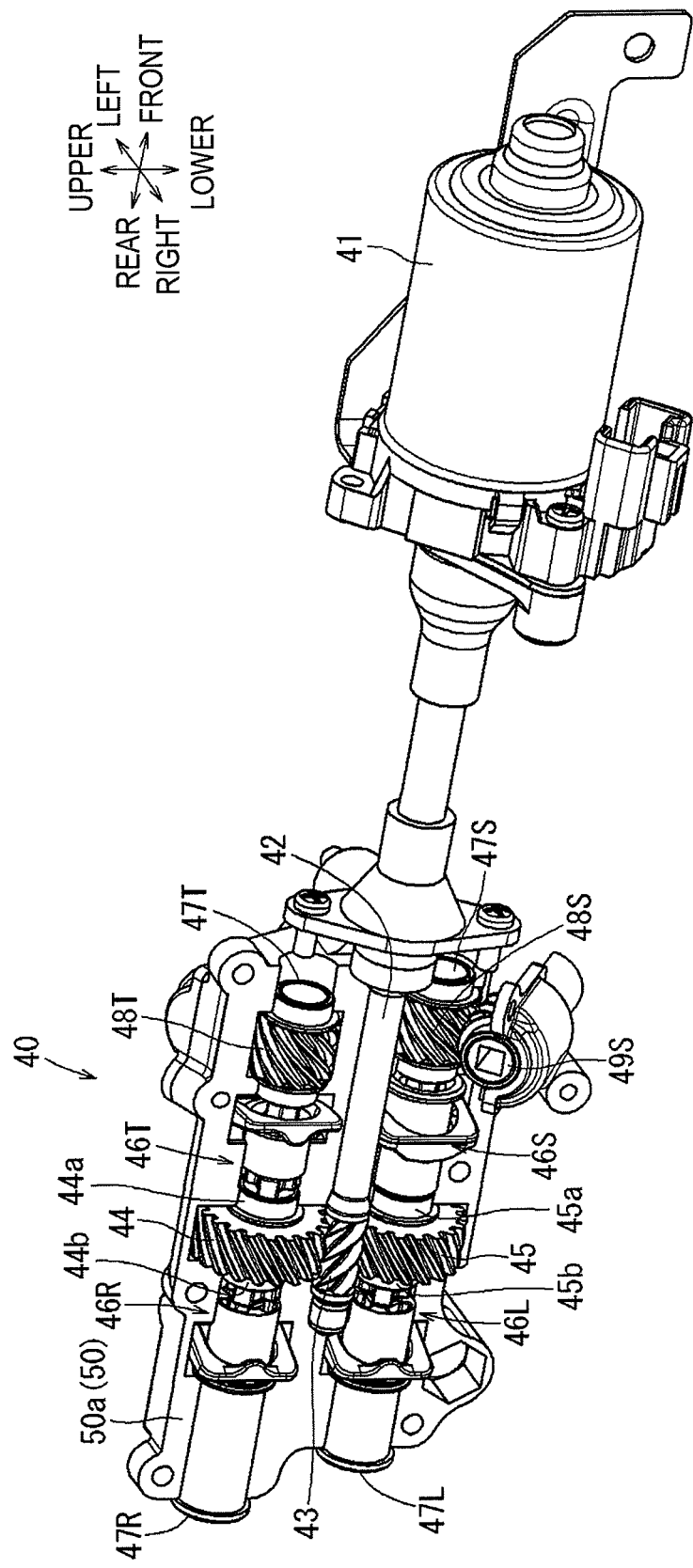
FIG. 9 is an enlarged perspective view of a drive mechanism portion in the first embodiment.

FIG. 8 shows a part of a schematic system explanatory view of a seat drive device according to a fourth embodiment. In the fourth embodiment, a connection member 540 is provided between the first transmission member 621 and the second transmission member 622 in the second and third embodiments. When the first transmission member 621 and the second transmission member 622 are spaced apart from each other, the connection member 540 is a member for transmitting the movement of the second transmission member 622 to a position adjacent to the first transmission member 621. Then, the first operation restricting portion 621d and a second operation restricting portion 540b are respectively provided on mutually adjacent portions of the first transmission member 621 and the connection member 540. The first operation restricting portion 621d is provided at a portion of the first transmission member 621 adjacent to the connection member 540, and the second operation restricting portion 540b is provided at a portion of the connection member 540 adjacent to the first transmission member 621.

The functions of the first operation restricting portion 621d and the second operation restricting portion 540b in the fourth embodiment are completely the same as those of the first operation restricting portions 620d, 621d and the second operation restricting portions 52e, 622d in each of the first to third embodiments.

Figure 10:
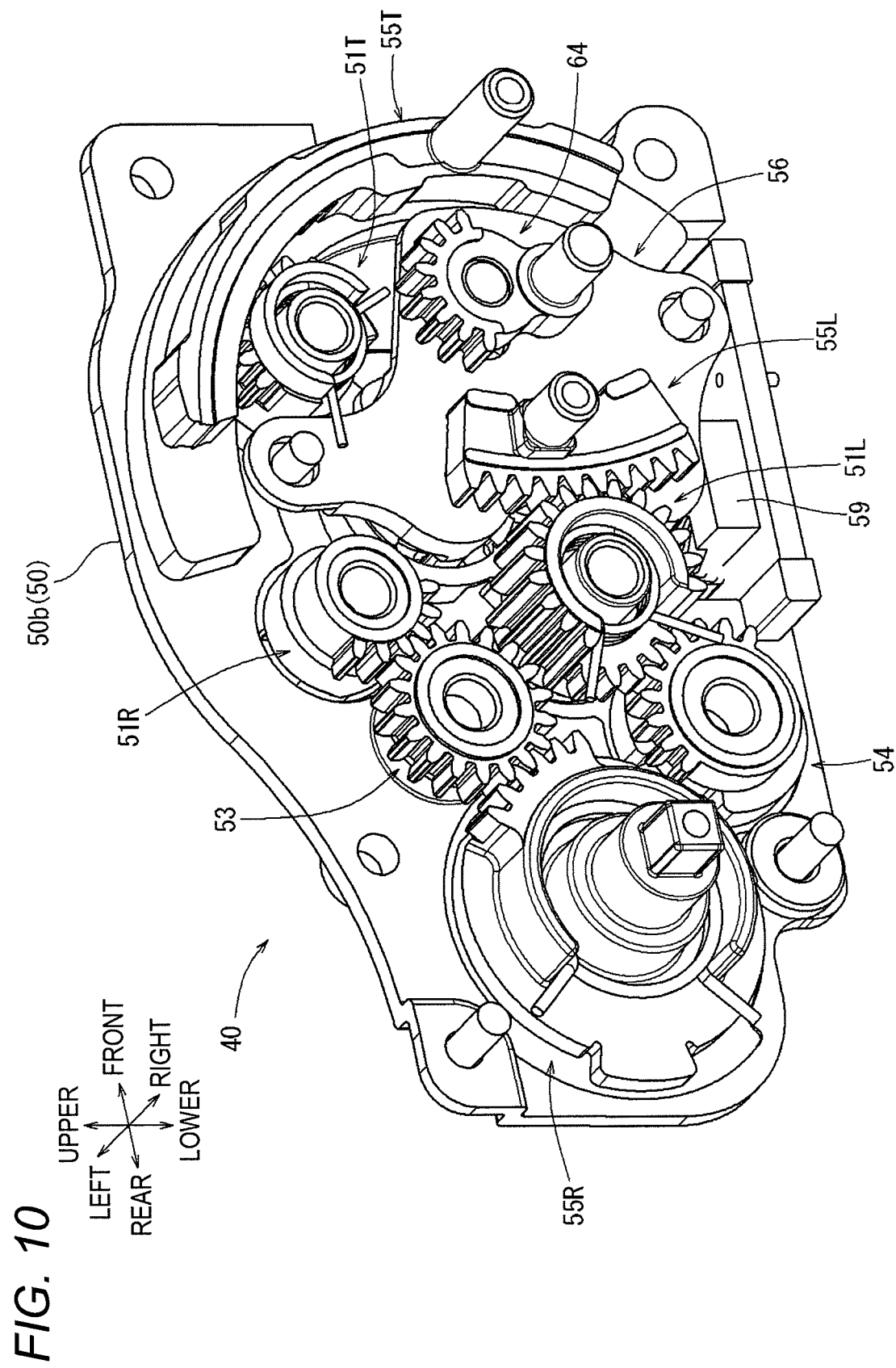
FIG. 10 is an enlarged perspective view of an operation mechanism portion in the first embodiment.

FIGS. 9 to 12 show details of the driving device 40. The driving device 40 includes a driving mechanism part shown in FIG. 9 and an operating mechanism part shown in FIG. 10. Meanwhile, in FIG. 10, illustration of a switch cover 65, a slide operation knob 66 and a recliner operation knob 67 is omitted.

The driving mechanism part of the driving device 40 includes a single drive motor 41. The drive motor 41 includes a single motor output shaft 42. A worm 43 is coupled to the motor output shaft 42. A pair of worm wheels 44, 45 disposed in an up and down direction is meshed with the worm 43. Therefore, the combination of the worm 43 and the worm wheels 44, 45 causes uniaxial rotation output from the drive motor 41 to be converted into biaxial rotation output.

Clutch mechanisms are respectively coupled to both sides in the front and rear direction of each rotation shaft of the worm wheels 44, 45. That is, a tilting clutch mechanism 46T is coupled to an input shaft 44a on the front side of the rotation shaft of the worm wheel 44 and a recliner clutch mechanism 46R is coupled to an input shaft 44b on the rear side thereof. Further, a sliding clutch mechanism 46S is coupled to an input shaft 45a on the front side of the rotation shaft of the worm wheel 45 and a lifter clutch mechanism 46L is coupled to an input shaft 45b on the rear side thereof.

A helical gear 48T is coupled to an output shaft 47T of the tilting clutch mechanism 46T. A helical gear (not shown) having a rotation axis arranged in a direction intersecting with a rotation axis of the helical gear 48T is meshed with the helical gear 48T. The combination of the helical gear 48T and the helical gear (not shown) causes an axial direction of the output shaft 47T of the tilting clutch mechanism 46T to be converted.

Furthermore, a helical gear 48S is coupled to an output shaft 47S of the sliding clutch mechanism 46S. A helical gear 49S having a rotation axis arranged in a direction intersecting with a rotation axis of the helical gear 48S is meshed with the helical gear 48S. The combination of the helical gears 48S, 49S causes an axial direction of the output shaft 47S of the sliding clutch mechanism 46S to be converted. Meanwhile, axial directions of an output shaft 47R of the recliner clutch mechanism 46R and an output shaft 47L of the lifter clutch mechanism 46L are not converted.

The sliding clutch mechanism 46S corresponds to the above-described first clutch mechanism 461 and is normally in a connected state. The tilting clutch mechanism 46T, the lifter clutch mechanism 46L and the recliner clutch mechanism 46R correspond to the above-described second clutch mechanism 462 and are normally in a non-connected state.

Members such as the clutch mechanisms 46S, 46T, 46L, 46R constituting the driving mechanism part of the driving device 40 are accommodated in a gear case half 50a. A gear case half 50b is covered on the gear case half 50a. The gear case half 50a is combined with the gear case half 50b to form a gear case 50 that is a single case (see FIG. 10).

The operating mechanism part shown in FIG. 10 is configured such that the first clutch driving unit 511, the second clutch driving unit 512 (not shown) and the switch operating unit 580 (not shown) and the like are disposed on the right side of the gear case half 50b (gear case 50) and the switch cover 65 is covered thereon (see FIG. 1). Further, a slide operation knob (corresponding to the above-described first operation member and also corresponding to the first operation knob) 66 and a recliner operation knob (corresponding to the above-described second operation member and also corresponding to the second operation knob) 67 are disposed on the right side of the switch cover 65.

Figure 11:
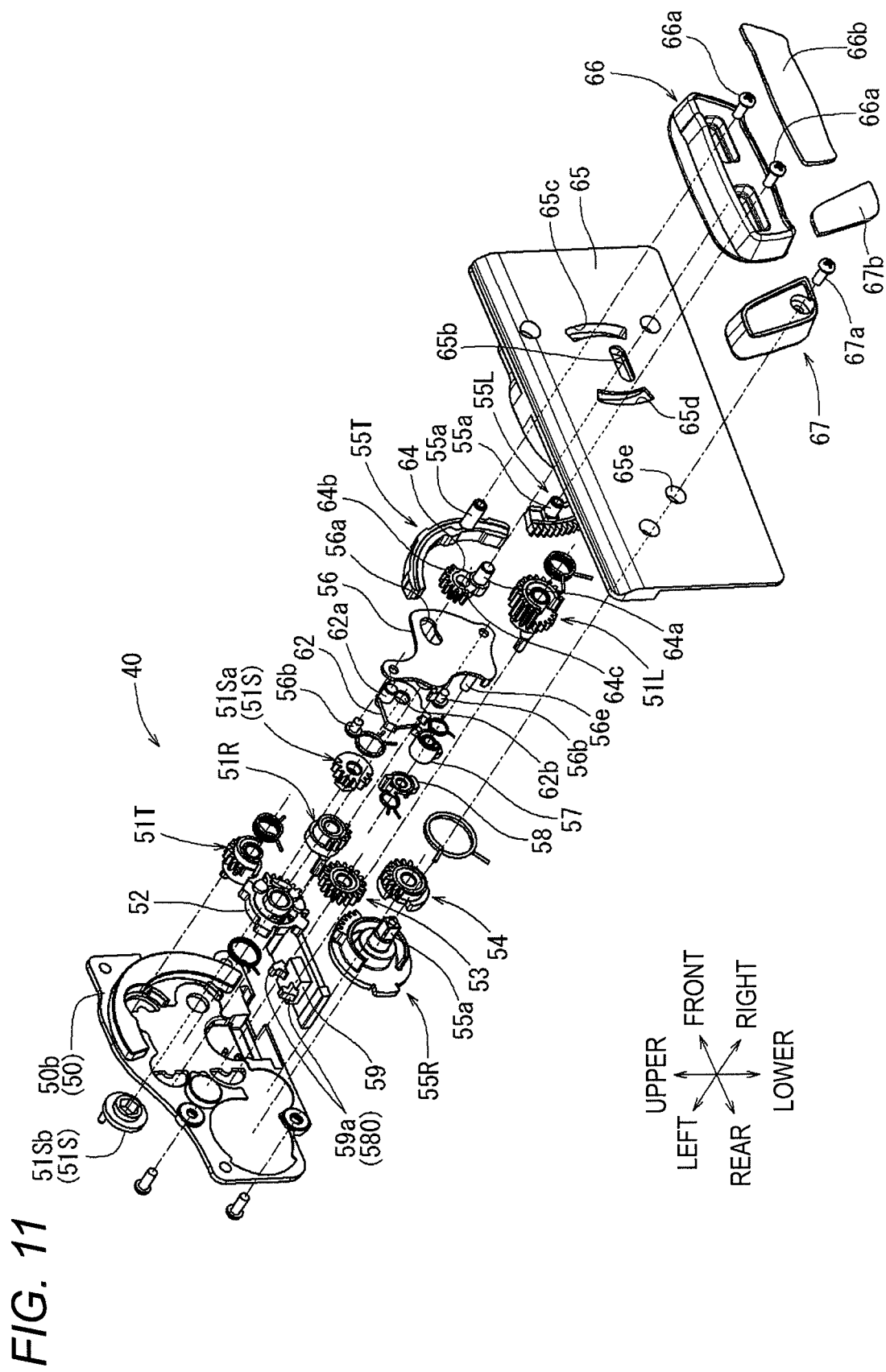
FIG. 11 is an exploded perspective view of the entire drive device in the first embodiment.
Figure 12:
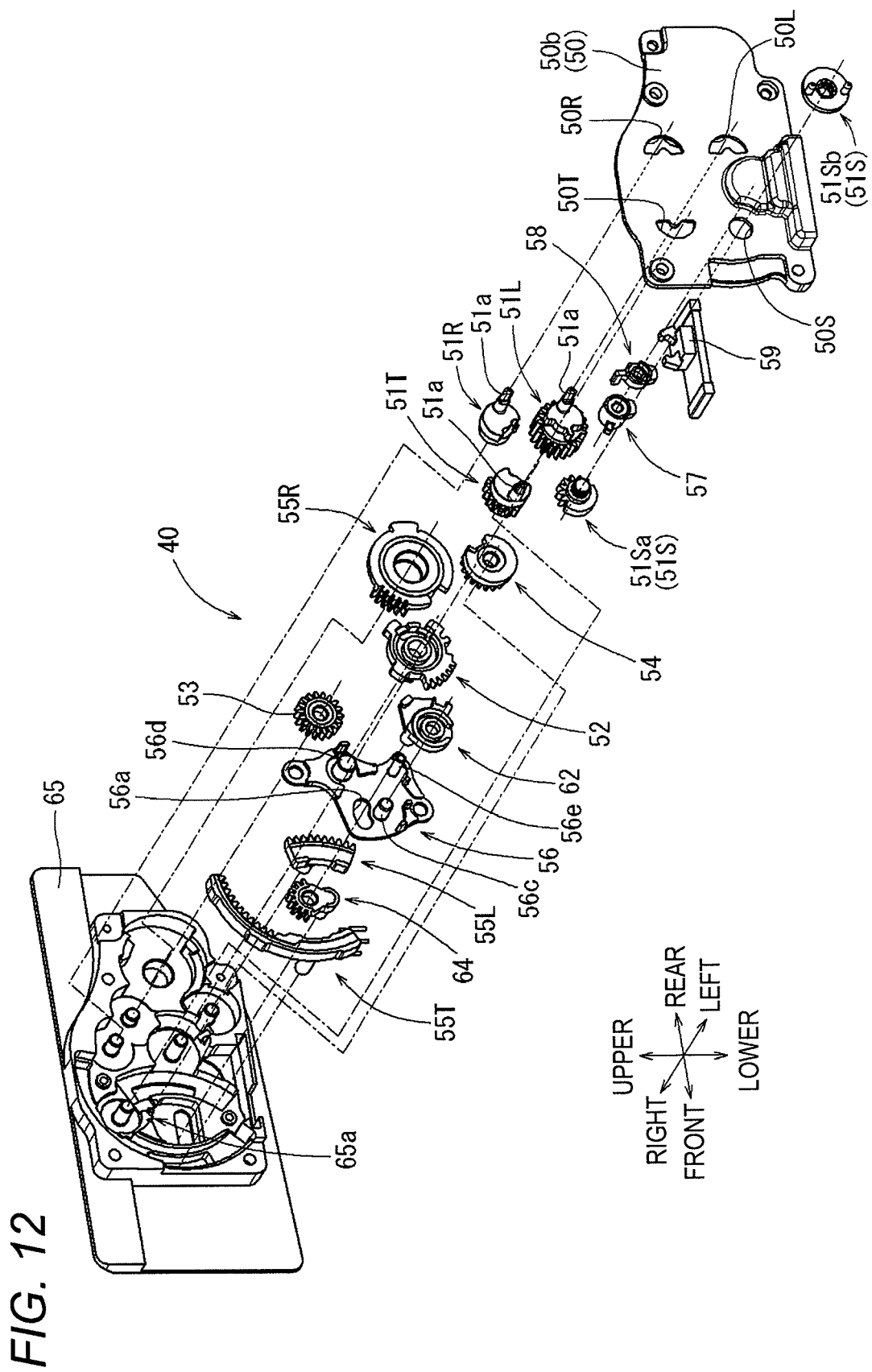
FIG. 12 is an exploded perspective view similar to FIG. 11, as seen from a direction different from FIG. 11.

FIGS. 10 to 12 show a detailed configuration of the operating mechanism part of the driving device 40. A sliding clutch pin 51S, a tilting clutch pin 51T, a lifter clutch pin 51L and a recliner clutch pin 51R are disposed corresponding to each of the clutch mechanisms 46S, 46T, 46L, 46R with the gear case half 50b therebetween (see FIGS. 24 and 25). The sliding clutch pin 51S corresponds to the above-described first clutch driving unit 511. Further, the recliner clutch pin 51R corresponds to the above-described second clutch driving unit 512.

When the sliding clutch pin 51S, the tilting clutch pin 51T, the lifter clutch pin 51L and the recliner clutch pin 51R are rotated, the clutch mechanisms 46S, 46T, 46L, 46R corresponding thereto are operated to the non-connected state or the connected state, respectively. The tilting clutch pin 51T is rotationally driven by a tilting drive gear 55T, the lifter clutch pin 51L is rotationally driven by a lifter drive gear 55L, and the recliner clutch pin 51R is rotationally driven by a recliner drive gear 55R via a recliner gear 53. The tilting drive gear 55T is coupled to the slide operation knob 66 through a through-hole 65c of the switch cover 65, the lifter drive gear 55L is coupled to the slide operation knob 66 through a through-hole 65d of the switch cover 65, and the recliner drive gear 55R is coupled to the recliner operation knob 67 through a through-hole 65e of the switch cover 65. Therefore, when a front end portion of the slide operation knob 66 is operated to move from an original position to an adjustment position in an up and down direction, the tilting clutch pin 51T is rotated by the gear of the tilting drive gear 55T. When a rear end portion of the slide operation knob 66 is operated to move from the original position to the adjustment position in the up and down direction, the lifter clutch pin 51L is rotated by the gear of the lifter drive gear 55L. When an upper end portion of the recliner operation knob 67 is operated to move from an original position to an adjustment position in the front and rear direction, the recliner clutch pin 51R is rotated by the gear of the recliner drive gear 55R via the recliner gear 53.

The slide operation knob 66 is fixed to a leading end of a projection 55a of the tilting drive gear 55T and a leading end of a projection 55a of the lifter drive gear 55L by two screws 66a. Further, the recliner operation knob 67 is fixed to a leading end of a projection 55a of the recliner drive gear 55R by a screw 67a. Then, knob covers 66b, 67b are covered on the right side of the slide operation knob 66 and the recliner operation knob 67, respectively.

Figure 16:
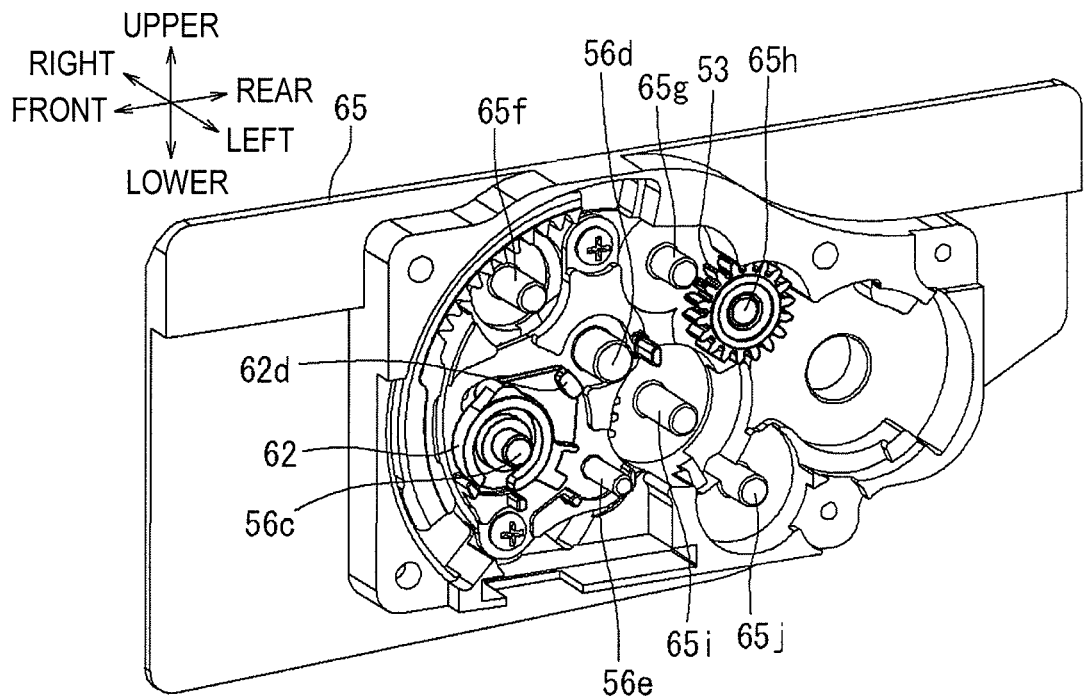
FIG. 16 is a perspective view for explaining a procedure of assembling the operation mechanism portion to the switch cover in the first embodiment, showing a first procedure.
Figure 17:
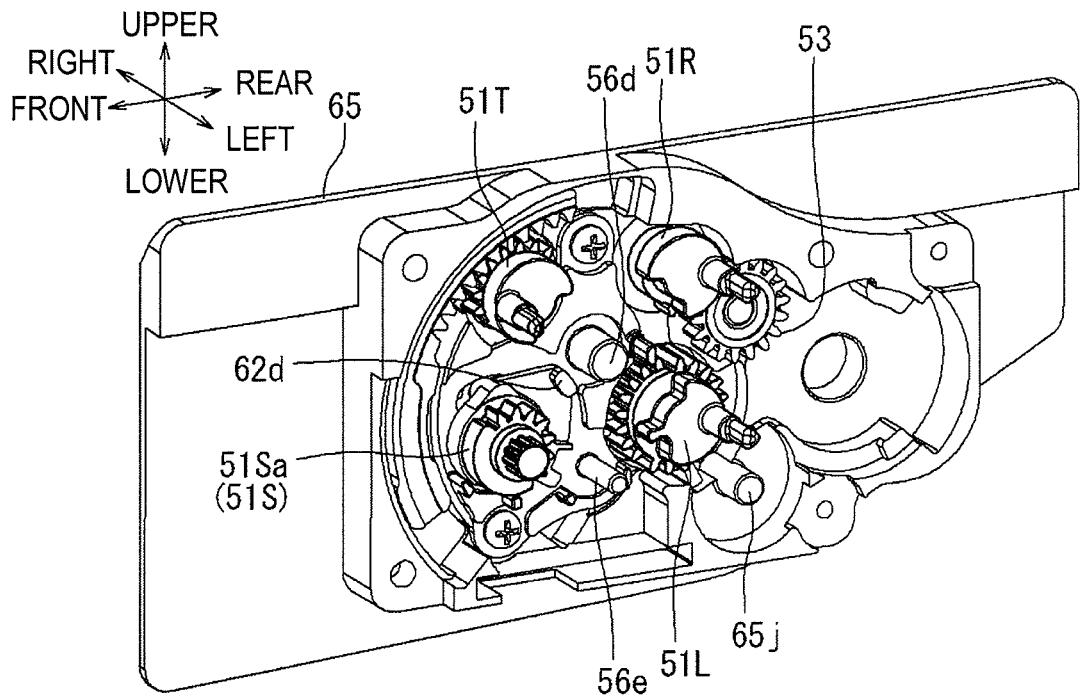
FIG. 17 is a perspective view for explaining an assembly procedure similar to FIG. 16, showing a second procedure.
Figure 18:
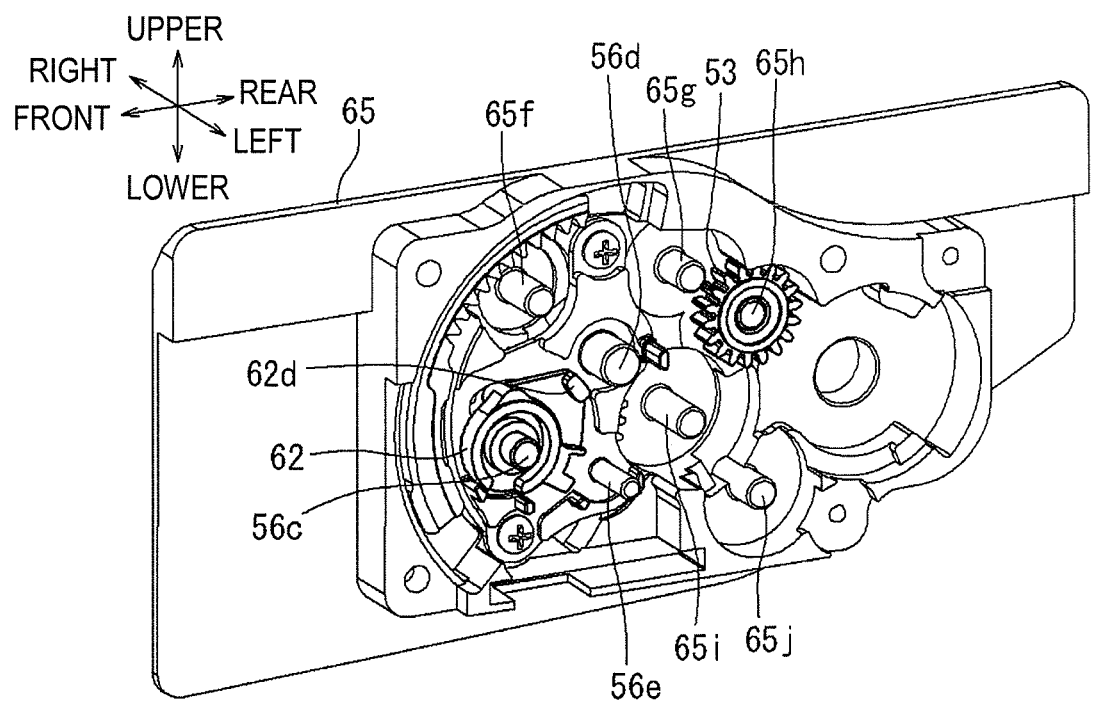
FIG. 18 is a perspective view for explaining an assembly procedure similar to FIG. 16, showing a third procedure.
Figure 19:
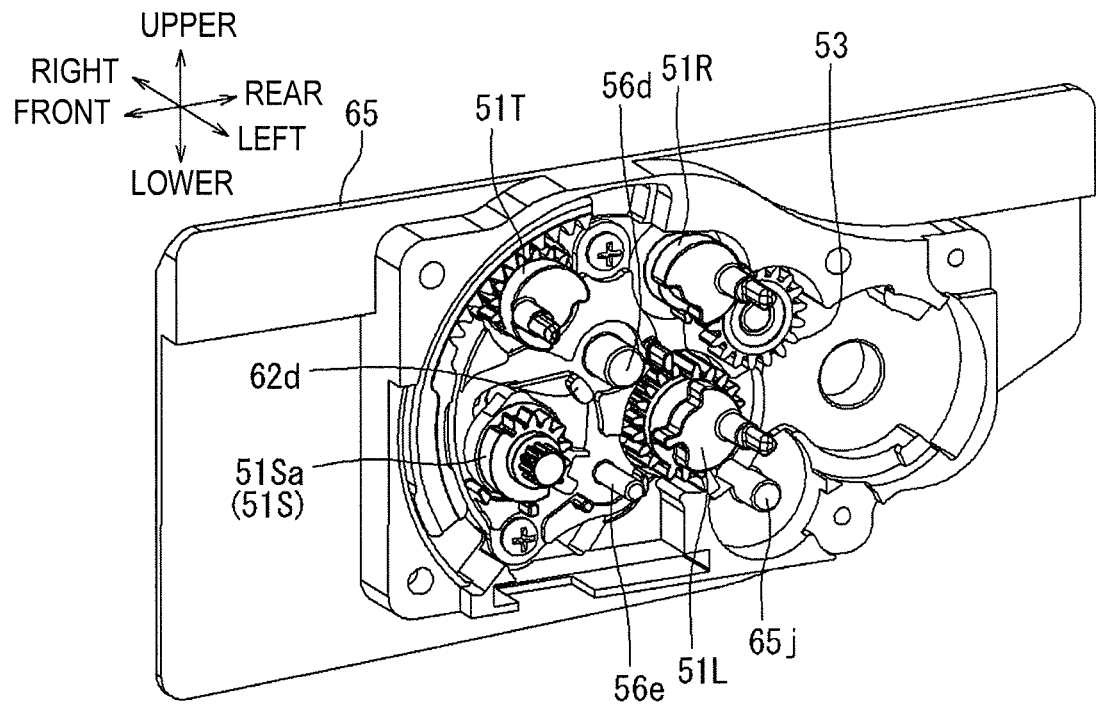
FIG. 19 is a perspective view for explaining an assembly procedure similar to FIG. 16, showing a fourth procedure.
Figure 24:
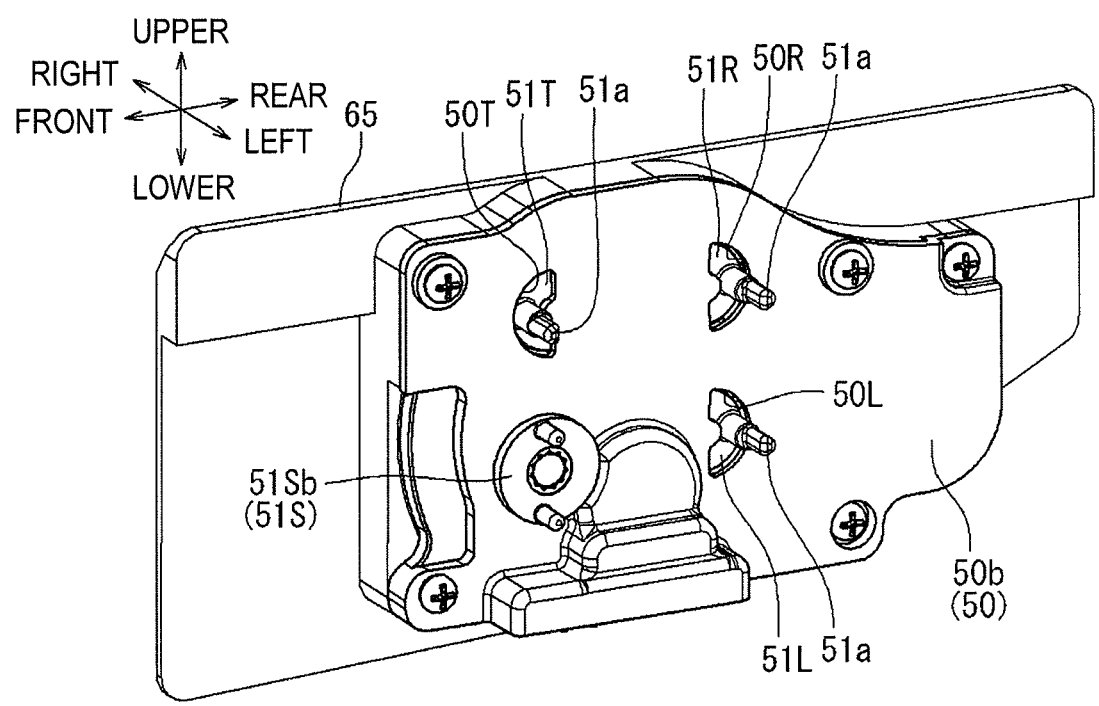
FIG. 24 is a perspective view for explaining an assembly procedure similar to FIG. 16, showing a ninth procedure.
Figure 27:
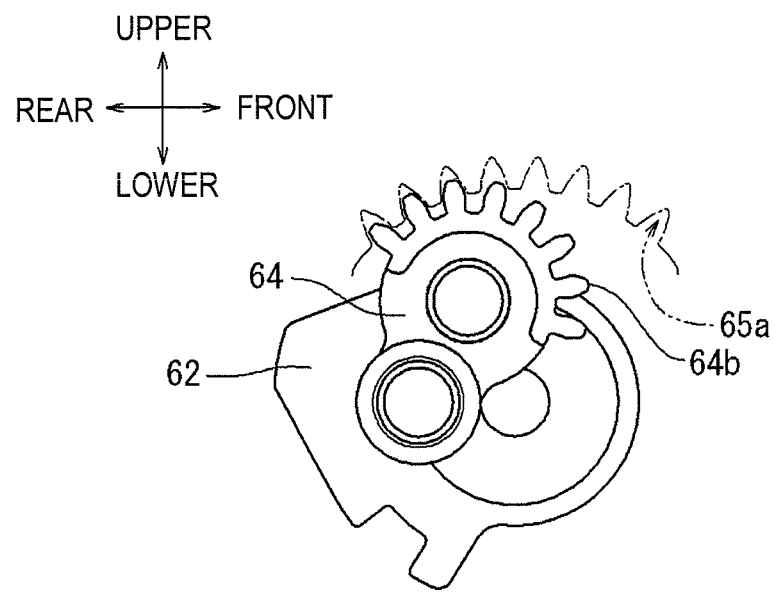
FIG. 27 is a perspective view showing the relationship between a slide gear and a trochoid gear in the first embodiment.
Figure 28:
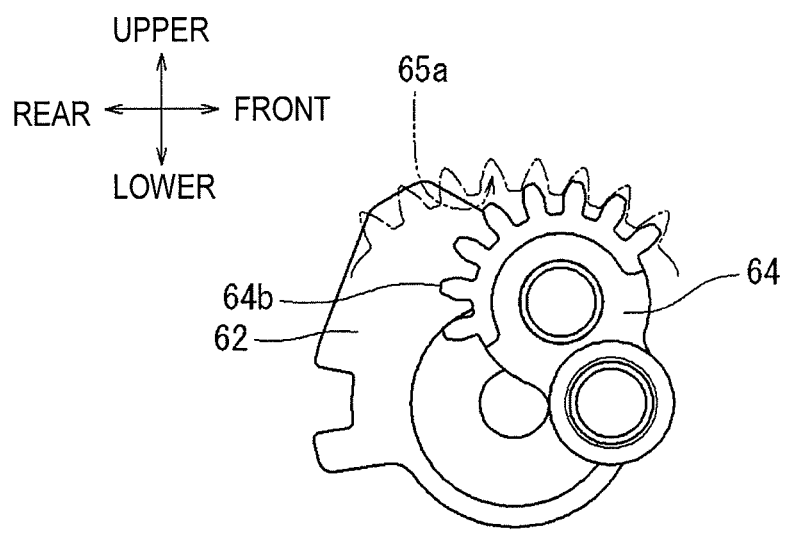
FIG. 28 is a perspective view showing the relationship between the slide gear and the trochoid gear similarly to FIG. 27 and showing a state in which the slide gear is operated in a direction opposite to that in FIG. 27.

The sliding clutch pin 51S is coupled to be rotatably driven by a slide link 62 and a slide gear 64. As shown in FIGS. 11 and 16, a projection 64a of the slide gear 64 is coupled to the slide operation knob 66 in a state where a gear portion 64b of the slide gear 64 is meshed with a trochoid gear 65a of the switch cover 65. Further, as shown in FIGS. 17 and 18, a through-hole 62b of the slide link 62 is rotatably supported by being fitted to a projection 56c of an inside plate 56, and a projection 62a of the slide link 62 is coupled by being fitted to a fitting hole 64c of the slide gear 64 through a through-hole 56a of the inside plate 56. Therefore, when the slide operation knob 66 is operated to slide in the front and rear direction, as shown in FIGS. 27 and 28, the slide gear 64 is swung in the front and rear direction and the slide link 62 is pivoted about the projection 56c of the inside plate 56 following the swing of the slide gear 64. As shown in FIG. 19, a sliding clutch pin gear portion 51Sa is also fitted to the projection 56c of the inside plate 56. The sliding clutch pin gear portion 51Sa is coupled to the slide link 62 so as to pivot in synchronization with the slide link 62. Meanwhile, as shown in FIGS. 11 and 24, a sliding clutch pin engaging portion 51Sb is coupled to the left side of the sliding clutch pin gear portion 51Sa. When the sliding clutch pin engaging portion 51Sb is pivoted by the sliding clutch pin gear portion 51Sa, the sliding clutch mechanism 46S is brought into the non-connected state. The sliding clutch pin engaging portion 51Sb is coupled to the sliding clutch pin gear portion 51Sa, thereby constituting the sliding clutch pin 51S.

Figure 21:
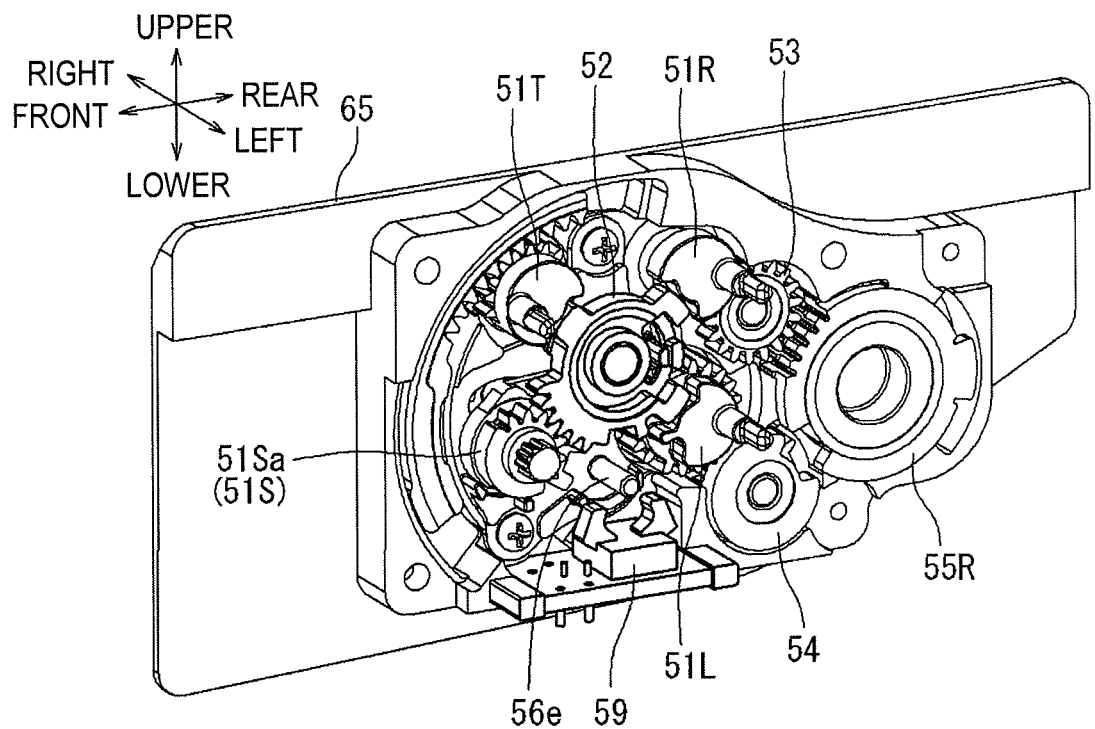
FIG. 21 is a perspective view for explaining an assembly procedure similar to FIG. 16, showing a sixth procedure.
Figure 25:
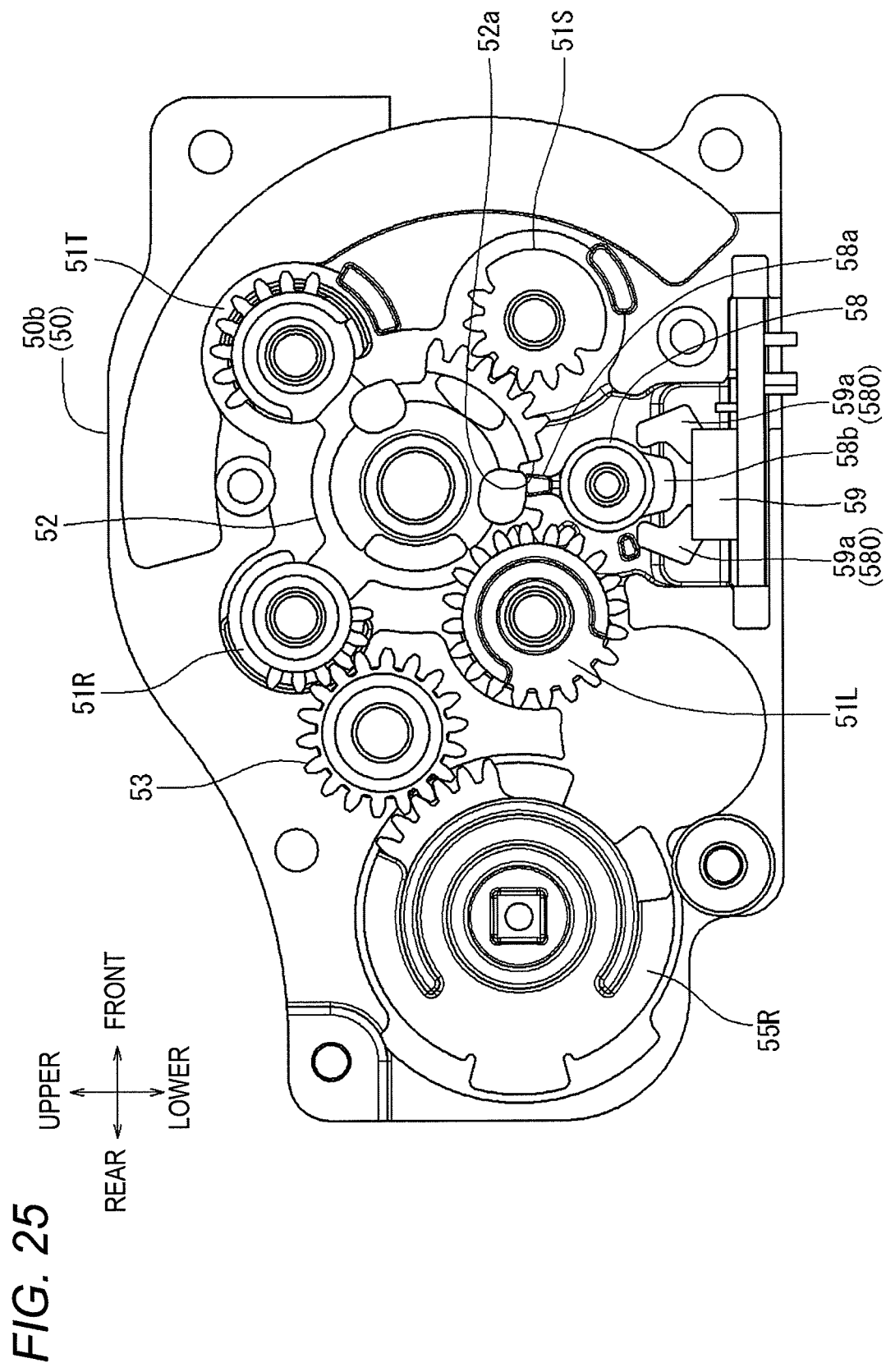
FIG. 25 is an explanatory view for explaining a switch actuation during operations other than the sliding in the first embodiment.
Figure 26:
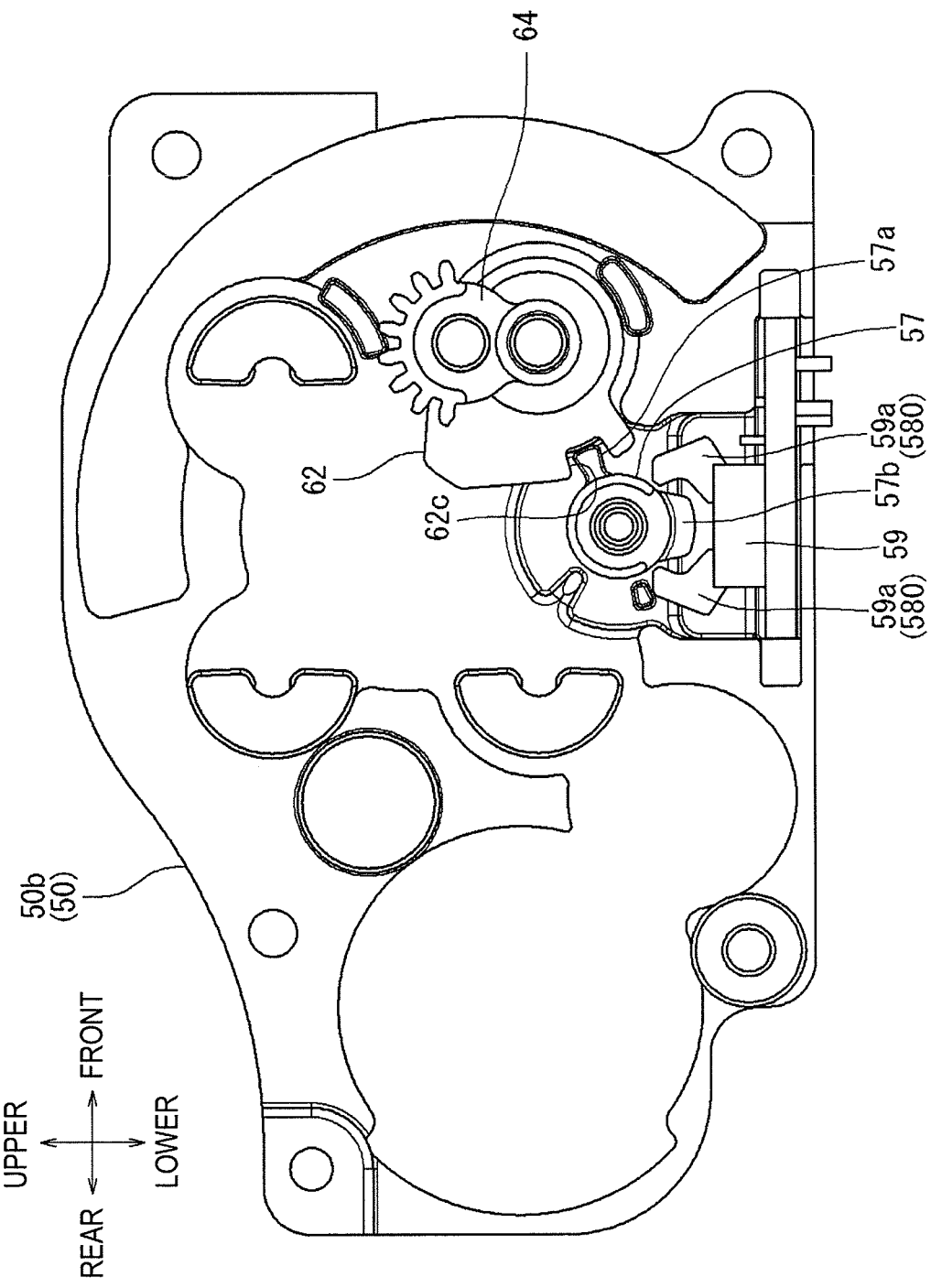
FIG. 26 is an explanatory view for explaining a switch actuation during the sliding operation in the first embodiment.

As shown in FIGS. 11, 21 and 25, the sliding clutch pin 51S, the tilting clutch pin 51T, the lifter clutch pin 51L and the recliner clutch pin 51R are arranged around the center cam 52. The center cam 52 is pivotably supported by a projection 56d of the inside plate 56. The center cam 52 is the cooperating member in the disclosure. When any one of the tilting clutch pin 51T, the lifter clutch pin 51L and the recliner clutch pin 51R is pivoted, the center cam 52 is also pivoted following the pivoting, and the sliding clutch pin 51S engaged with the center cam 52 is pivoted. Therefore, as described with reference to FIG. 5, when any one of the tilting clutch pin 51T, the lifter clutch pin 51L and the recliner clutch pin 51R corresponding to the second clutch driving unit is pivoted, the sliding clutch pin 51S corresponding to the first clutch driving unit 511 is actuated via the center cam 52 corresponding to the cooperating member.

As shown in FIGS. 11, 22, 23, 25 and 26, a switch link slide 57 and a switch link normal 58 are fitted to a projection 56e of the inside plate 56 so as to overlap in the left and right direction and are pivotably supported thereon. A connection piece 57a of the switch link slide 57 is engageable with a notch 62c of the slide link 62. Therefore, when the slide link 62 is pivoted, the switch link slide 57 is pivoted, and a protruding piece 57b of the switch link slide 57 operates one of operation pieces 59a of the limit switch 59 in accordance with the operation direction of the slide operation knob 66.

On the other hand, a connection piece 58a of the switch link normal 58 is engageable with a notch 52a of the center cam 52. Therefore, when the center cam 52 is pivoted, the switch link normal 58 is pivoted, and a protruding piece 58b of the switch link normal 58 operates one of the operation pieces 59a of the limit switch 59 in accordance with the operation direction of any one of the tilting clutch pin 51T, the lifter clutch pin 51L and the recliner clutch pin 51R. The width in the pivot direction of the notch 52a of the center cam 52 is set larger than the width in the pivot direction of the connection piece 58a of the switch link normal 58. In this way, the delay structure described with reference to FIG. 5 is configured (see FIG. 25). This is evident from the comparison of the width in the pivot direction of the notch 62c of the slide link 62 with the width in the pivot direction of the protruding piece 57b of the switch link slide 57 (see FIG. 26). Accordingly, as described with reference to FIG. 5, when the slide operation knob 66 corresponding to the first operation member is operated to slide, the operation pieces 59a of the limit switch 59 corresponding to the switch operating unit 580 are operated via the slide link 62 corresponding to the transmission member. Further, when the operation of any one of the lifter adjustment mechanism, the tilt adjustment mechanism and the reclining angle adjustment mechanism corresponding to the second operation member is performed, the operation pieces 59a of the limit switch 59 corresponding to the switch operating unit 580 are operated via any one of the tilting clutch pin 51T, the lifter clutch pin 51L and the recliner clutch pin 51R corresponding to the second clutch driving unit and via the center cam 52 corresponding to the cooperating member.

Figure 14:
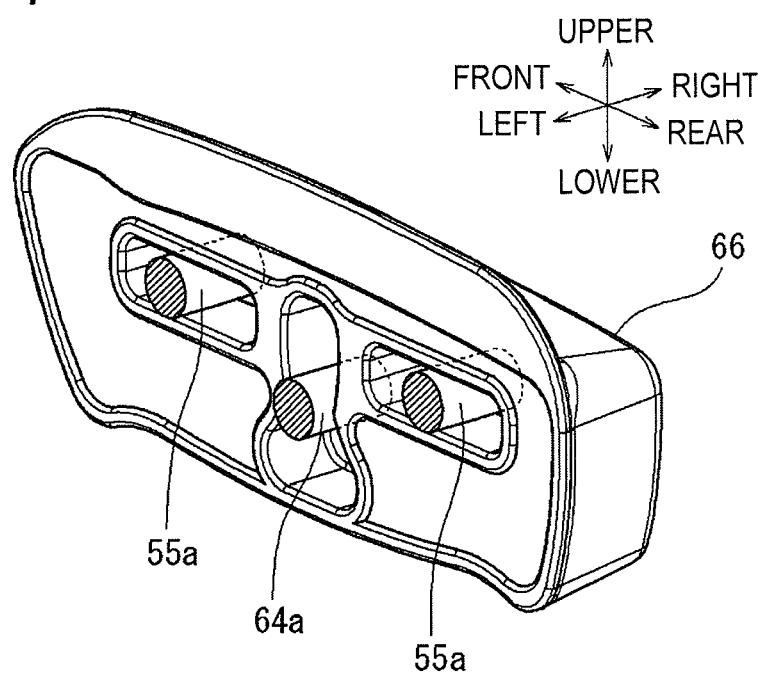
FIG. 14 is an enlarged perspective view of a slide operation knob in the first embodiment.
Figure 15:
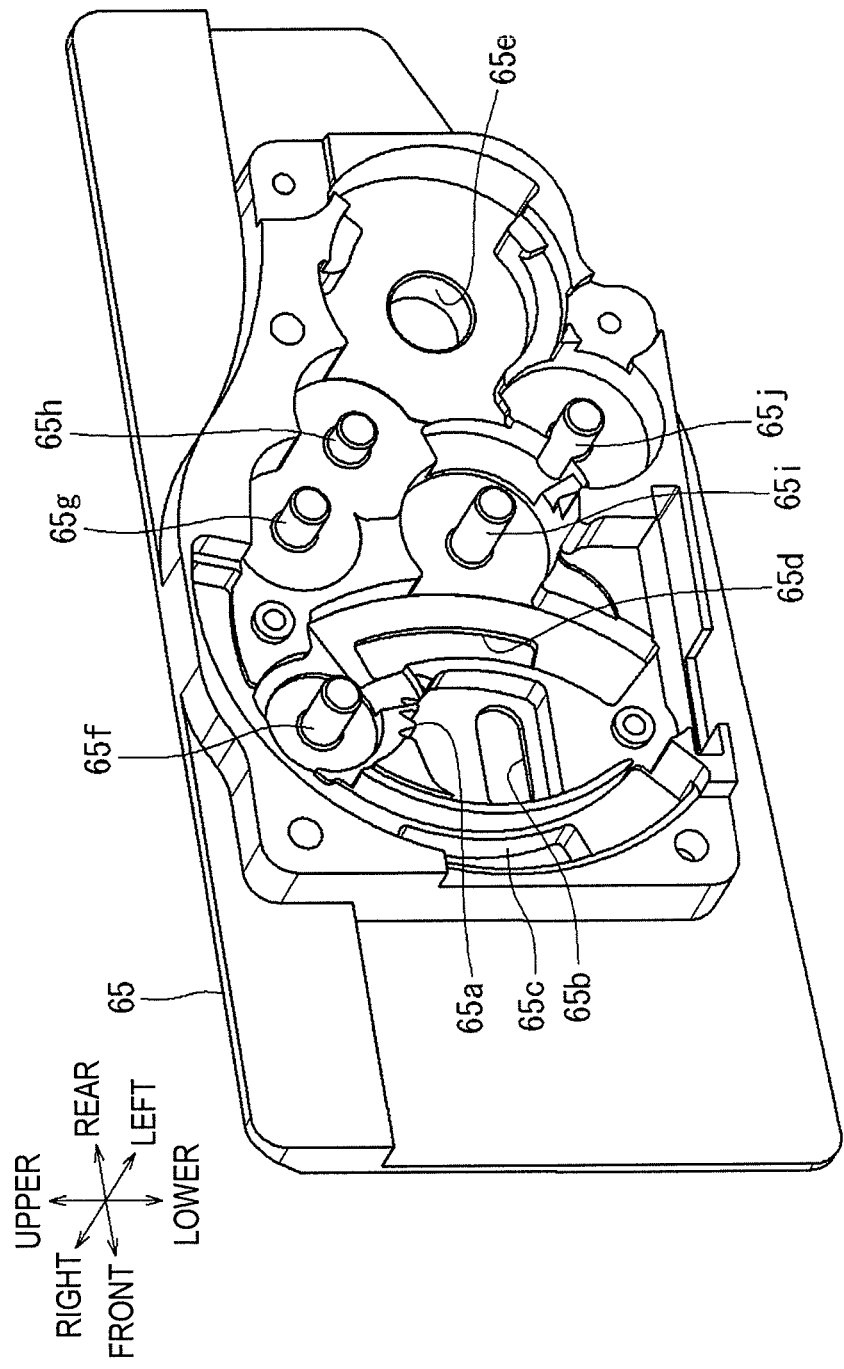
FIG. 15 is a rear-side perspective view of a switch cover in the first embodiment.

FIGS. 15 to 24 show a procedure of assembling each part assembled on the left surface of the switch cover 65 described above. First, as shown in FIGS. 15 and 16, the slide gear 64 is assembled in such a way that the gear portion 64b thereof is engaged with the trochoid gear 65a on the left surface of the switch cover 65. At this time, as shown in FIGS. 11 and 14, the projection 64a of the slide gear 64 passes through a through-hole 65b of the switch cover 65 and is coupled to the slide operation knob 66.

Figure 13:
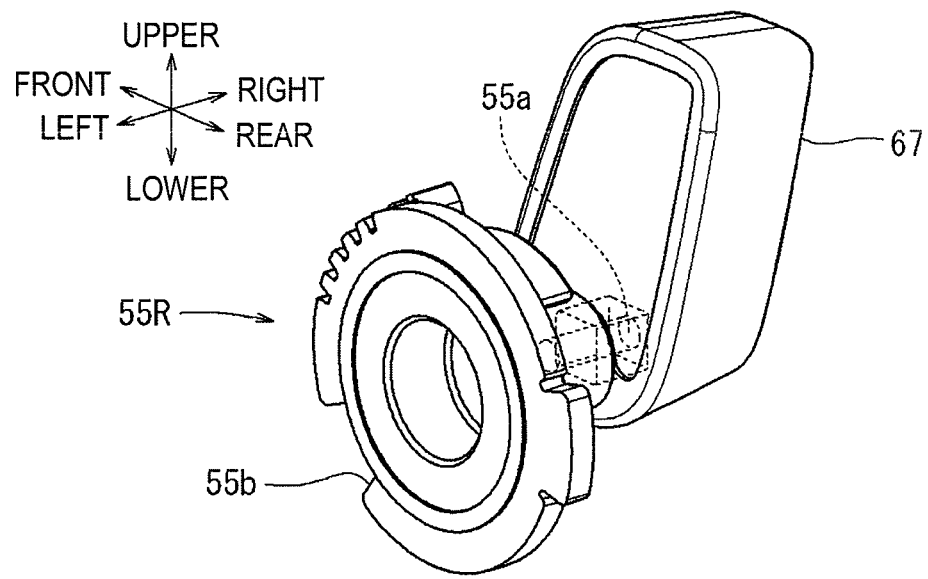
FIG. 13 is an enlarged perspective view of a recliner operation knob in the first embodiment.
Figure 20:
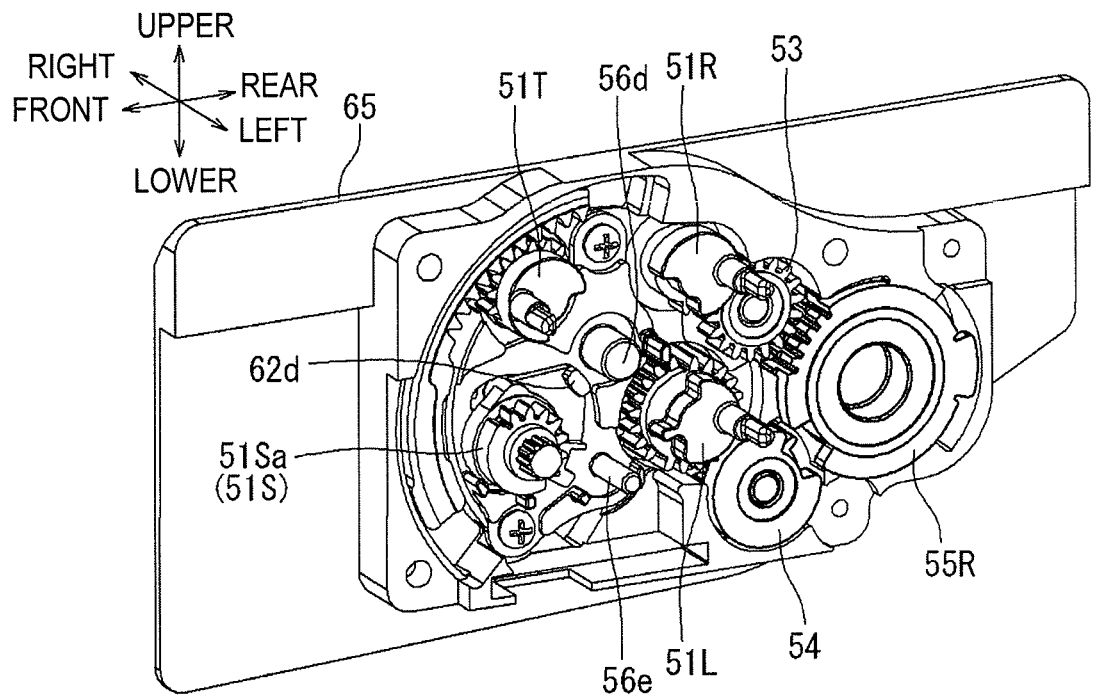
FIG. 20 is a perspective view for explaining an assembly procedure similar to FIG. 16, showing a fifth procedure.

Then, as shown in FIG. 17, the inside plate 56 is assembled by being covered on the slide gear 64. The inside plate 56 is fixed on the left surface of the switch cover 65 by a screw 56b. Then, as shown in FIG. 18, the slide link 62 is assembled by the projection 56c of the inside plate 56. Further, the recliner gear 53 is assembled by a projection 65h of the switch cover 65. Further, as shown in FIG. 19, the sliding clutch pin gear portion 51Sa is assembled so as to overlap with the left side of the slide link 62, and the tilting clutch pin 51T, the recliner clutch pin 51R and the lifter clutch pin 51L are assembled by projections 65f, 65g, 65i of the switch cover 65. Furthermore, as shown in FIG. 20, a recliner interlocking prevention link 54 is assembled by a projection 65j of the switch cover 65, and the recliner drive gear 55R is assembled to a position adjacent to the recliner interlocking prevention link 54. At this time, as shown in FIGS. 11 and 13, the projection 55a of the recliner drive gear 55R passes through the through-hole 65e of the switch cover 65 and is coupled to the recliner operation knob 67.

Figure 22:
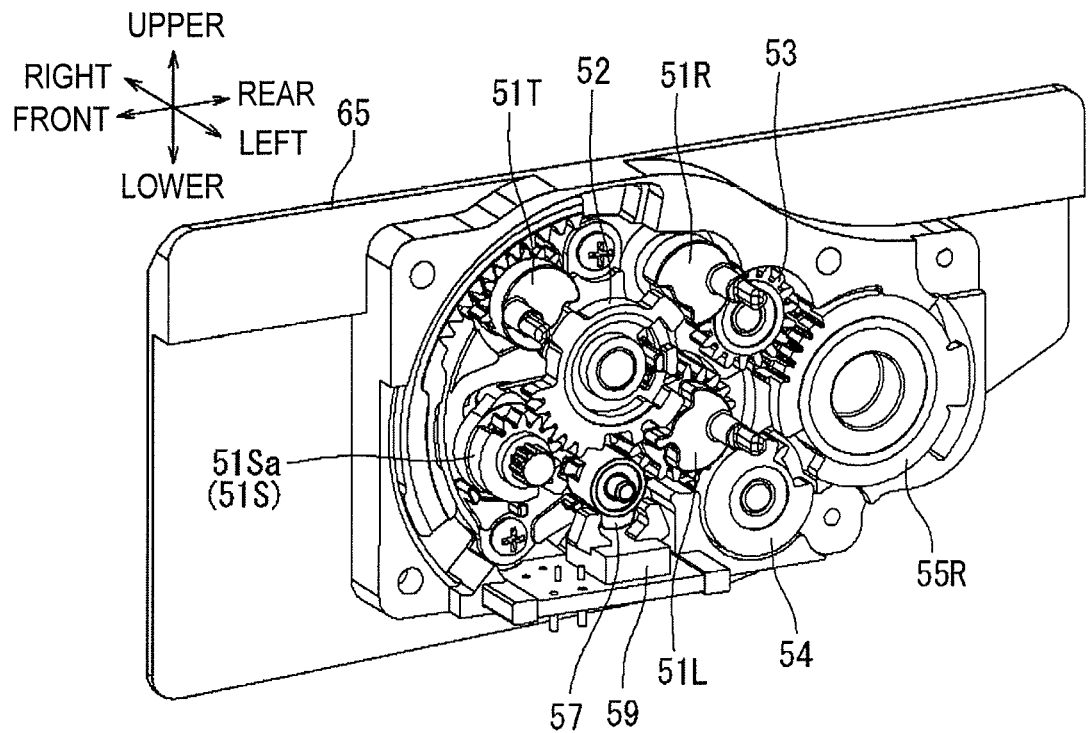
FIG. 22 is a perspective view for explaining an assembly procedure similar to FIG. 16, showing a seventh procedure.
Figure 23:
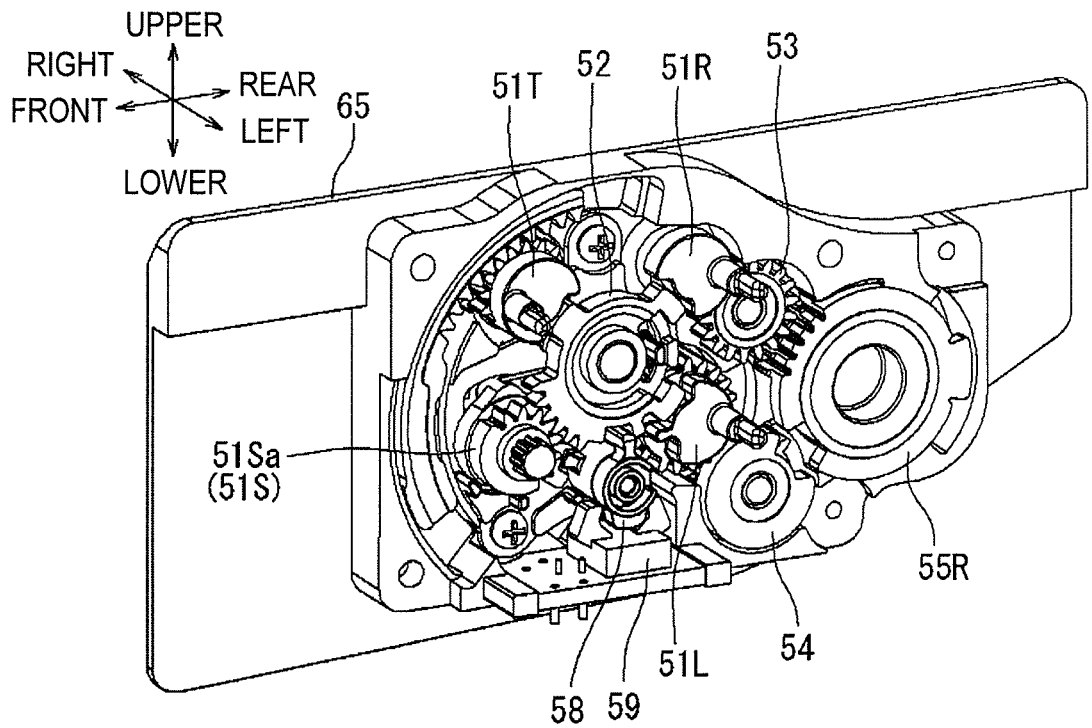
FIG. 23 is a perspective view for explaining an assembly procedure similar to FIG. 16, showing an eighth procedure.

Furthermore, as shown in FIG. 21, the center cam 52 is assembled by the projection 56d of the inside plate 56. Then, as shown in FIG. 22, the switch link slide 57 is assembled by the projection 56e of the inside plate 56, and the limit switch 59 is fixed to a lower portion of the switch cover 65 so as to face the protruding piece 57b of the switch link slide 57. Then, as shown in FIG. 23, the switch link normal 58 is assembled so as to overlap with the left side of the switch link slide 57. Finally, as shown in FIGS. 12 and 24, the gear case half 50b is covered on the left side of the switch cover 65, and each part assembled on the switch cover 65 is accommodated in the gear case half 50b. From four through-holes 50S, 50T, 50L, 50R of the gear case half 50b, each of projections 51a of the sliding clutch pin gear portion 51Sa, the tilting clutch pin 51T, the lifter clutch pin 51L and the recliner clutch pin 51R protrudes to the left side of the switch cover 65. In addition, the sliding clutch pin engaging portion 51Sb is coupled to the projection 51a of the sliding clutch pin gear portion 51Sa.

Figure 29:
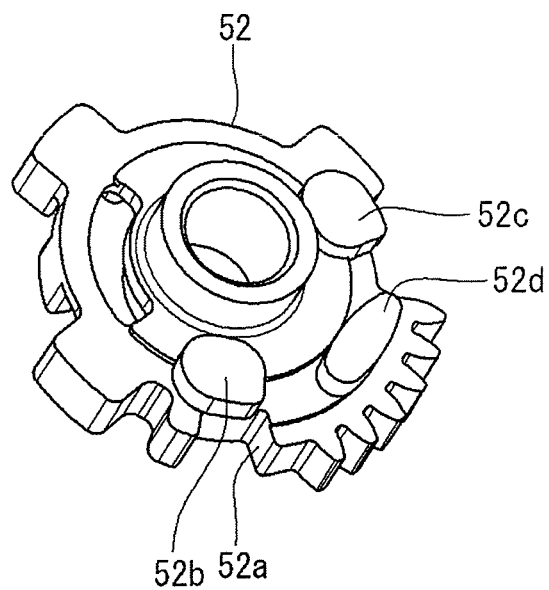
FIG. 29 is an enlarged perspective view of a center cam in the first embodiment.
Figure 30:
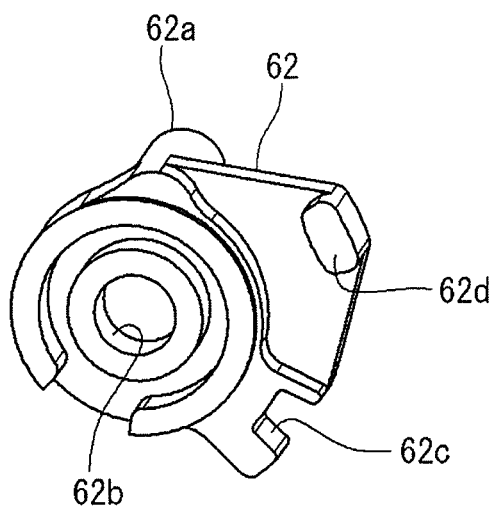
FIG. 30 is an enlarged perspective view of a slide link in the first embodiment.
Figure 37:
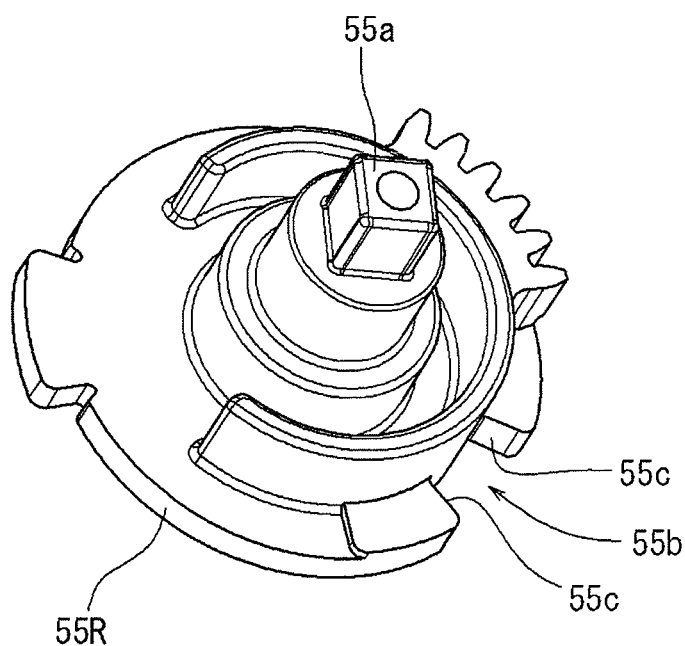
FIG. 37 is an enlarged perspective view of a recliner drive gear in the first embodiment.
Figure 38:
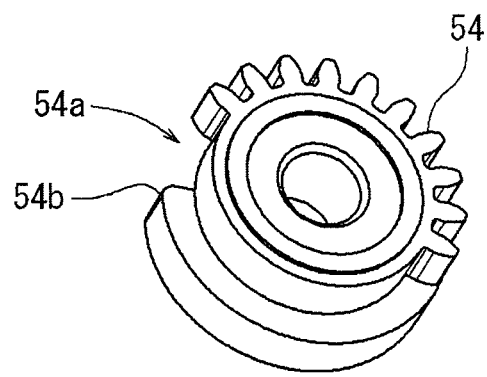
FIG. 38 is an enlarged perspective view of a recliner clutch pin in the first embodiment.

In the assembled state as described above, each of projections 62d, 52b to 52d is formed on the portions of the slide link 62 and the center cam 52, which face each other and overlap with each other, as shown in FIGS. 29 and 30. Further, each of notches 54a, 55b is formed on mutually adjacent portions of the recliner interlocking prevention link 54 and the recliner drive gear 55R, as shown in FIGS. 37 and 38. The recliner interlocking prevention link 54 corresponds to the first transmission member, and the recliner drive gear 55R corresponds to the second transmission member. Further, the notch 54a corresponds to the first notch in the disclosure, and the notch 55b corresponds to the second notch in the disclosure.

Figure 31:
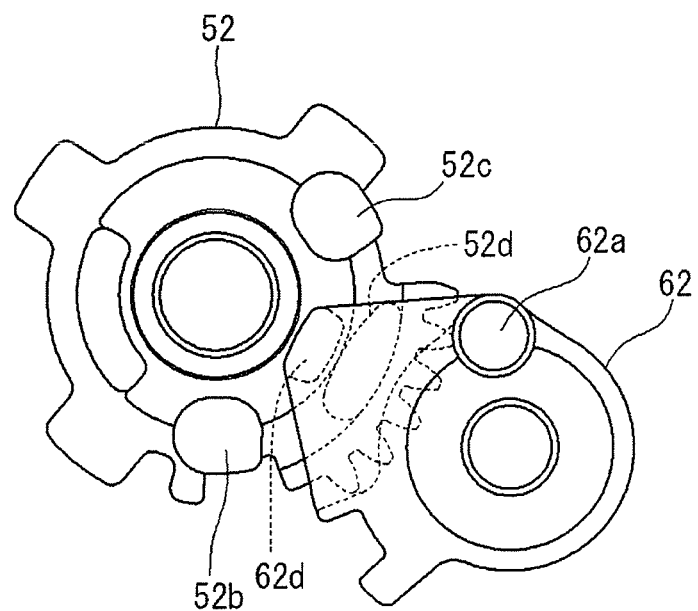
FIG. 31 is an enlarged front view showing a combined state of the center cam and the slide link.
Figure 32:
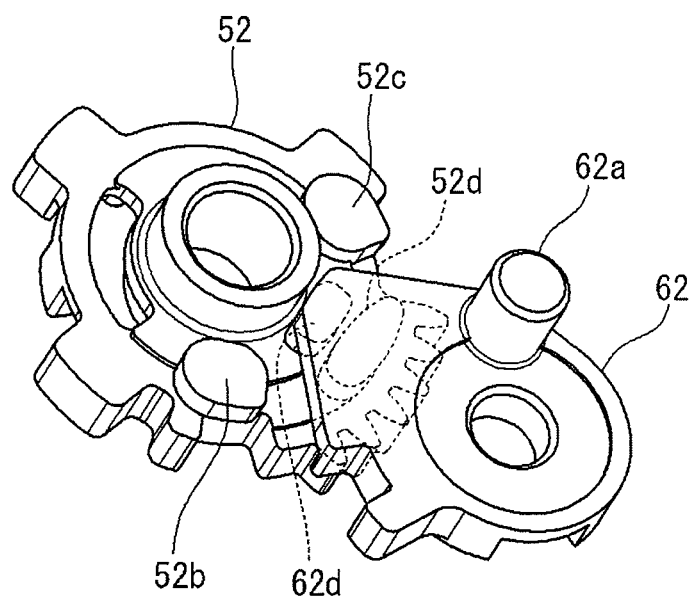
FIG. 32 is an enlarged perspective view showing a combined state of the center cam and the slide link.

As described above, the slide link 62 is pivoted when the slide operation knob 66 is operated to slide, and the center cam 52 is pivoted when the slide operation knob 66 or the recliner operation knob 67 is operated and any one of the tilting clutch pin 51T, the lifter clutch pin 51L and the recliner clutch pin 51R is pivoted. In an initial state where these operations are not performed, the relationship between the center cam 52 and the slide link 62 is in a state shown in FIGS. 31 and 32. In this state, the trajectories of the projections 52b to 52d when the center cam 52 is pivoted and the trajectory of the projection 62d when the slide link 62 is pivoted are in a relationship of intersecting with each other. The slide link 62 corresponds to the first transmission member or the transmission member in the disclosure, the center cam 52 corresponds to the second transmission member or the cooperating member in the disclosure, the projection 62d corresponds to the first operation restricting portion in the disclosure, and the projections 52b to 52d correspond to the second operation restricting portion in the disclosure.

Figure 33:
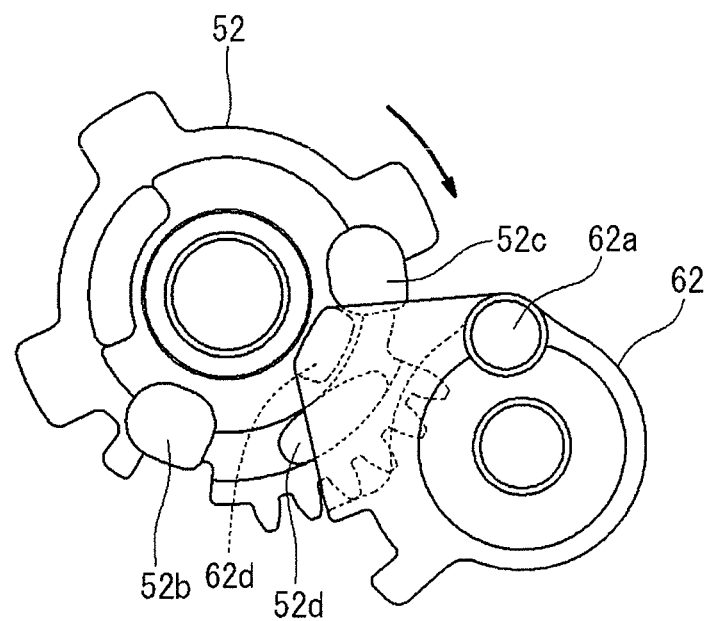
FIG. 33 is an enlarged front view similar to FIG. 31, showing a state in which the center cam is operated in one direction.
Figure 34:
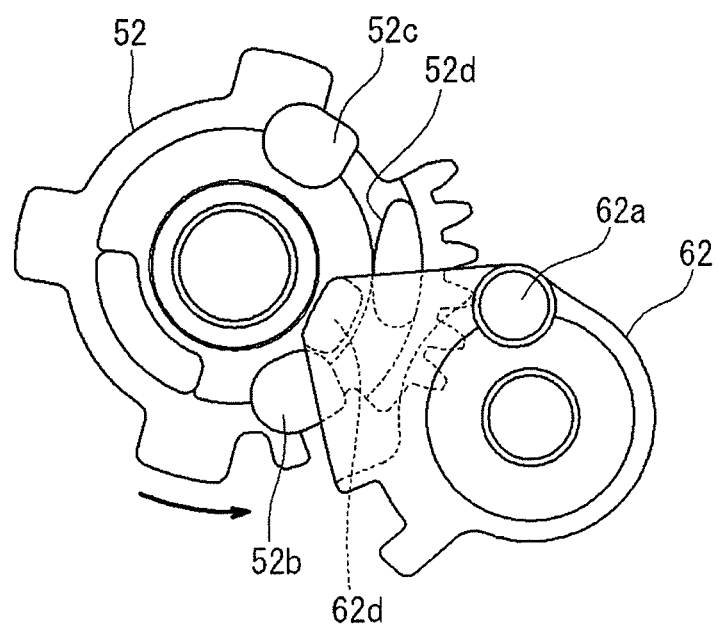
FIG. 34 is an enlarged front view similar to FIG. 31, showing a state in which the center cam is operated in the other direction.

FIG. 33 shows a state in which the center cam 52 is pivoted in the clockwise direction as indicated by an arrow. In this state, the projections 52c, 52d of the center cam 52 are positioned on both sides of the projection 62d of the slide link 62. Therefore, in this state, the slide link 62 cannot be pivoted. Further, FIG. 34 shows a state in which the center cam 52 is pivoted in the counter-clockwise direction as indicated by an arrow. In this state, the projections 52b, 52d of the center cam 52 are positioned on both sides of the projection 62d of the slide link 62. Therefore, in this state, the slide link 62 cannot be pivoted. In this way, in a state where the slide operation knob 66 or the recliner operation knob 67 is operated and any one of the tilting clutch pin 51T, the lifter clutch pin 51L and the recliner clutch pin 51R is pivoted, the sliding operation of the slide operation knob 66 is prevented.

Figure 35:
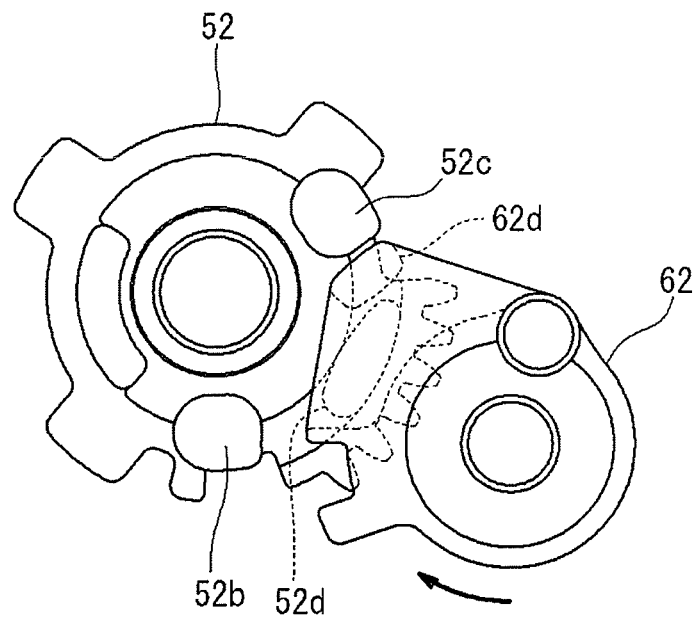
FIG. 35 is an enlarged front view similar to FIG. 31, showing a state in which the slide link is operated in one direction.
Figure 36:
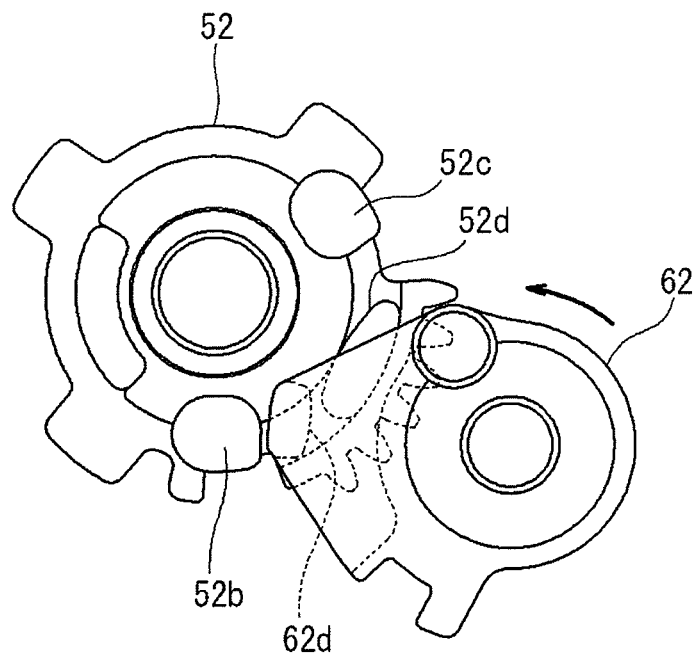
FIG. 36 is an enlarged front view similar to FIG. 31, showing a state in which the slide link is operated in the other direction.

FIG. 35 shows a state in which the slide link 62 is pivoted in the clockwise direction as indicated by an arrow. In this state, the projection 62d of the slide link 62 is positioned between the projections 52c, 52d of the center cam 52. Therefore, in this state, the center cam 52 cannot be pivoted. Further, FIG. 36 shows a state in which the slide link 62 is pivoted in the counter-clockwise direction as indicated by an arrow. In this state, the projection 62d of the slide link 62 is positioned between the projections 52b, 52d of the center cam 52. Therefore, in this state, the center cam 52 cannot be pivoted. In this way, by operating the slide operation knob 66 or the recliner operation knob 67 in a state where the slide operation knob 66 is operated to slide, any one of the tilting clutch pin 51T, the lifter clutch pin 51L and the recliner clutch pin 51R is prevented from being pivoted.

Figure 39:
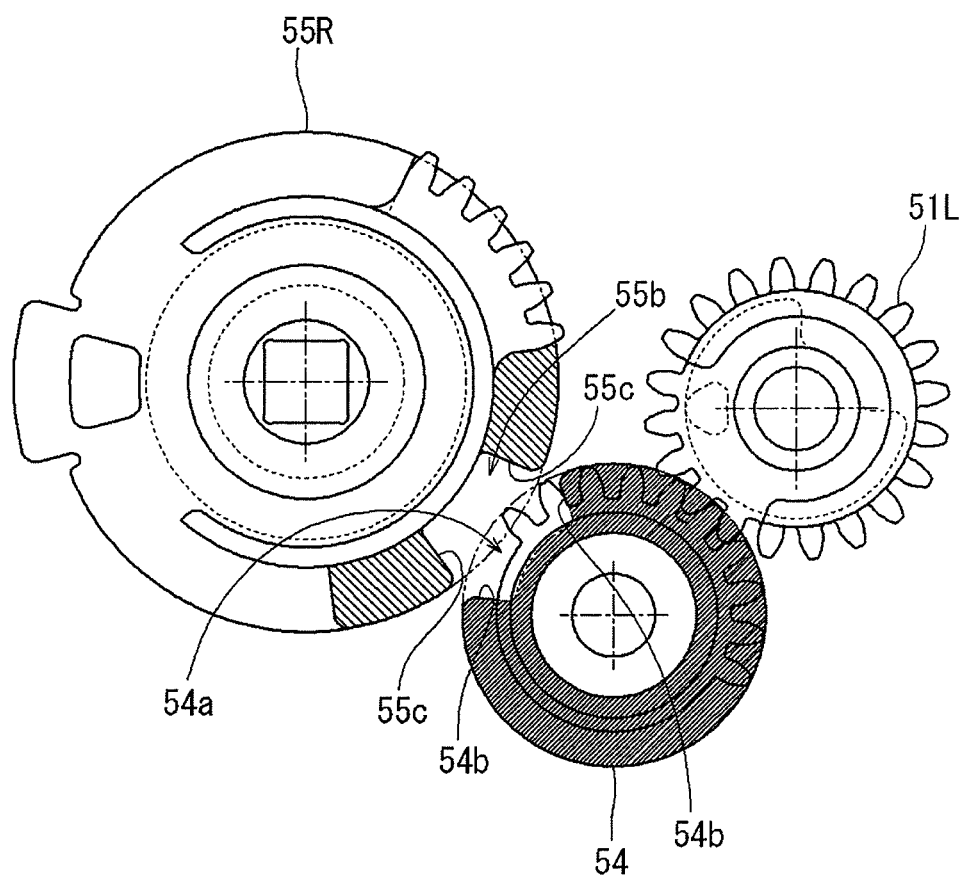
FIG. 39 is an enlarged front view showing a combined state of the recliner drive gear and the recliner clutch pin.

As described above, the recliner drive gear 55R is pivoted when the recliner operation knob 67 is operated to tilt, and the recliner interlocking prevention link 54 is pivoted when the slide operation knob 66 is operated and the lifter clutch pin 51L is pivoted. In an initial state where these operations are not performed, the relationship between the recliner drive gear 55R and the recliner interlocking prevention link 54 is in a state shown in FIG. 39. In this state, the notch 54a of the recliner interlocking prevention link 54 and the notch 55b of the recliner drive gear 55R are located at positions facing each other. Both sides of the notch 54a serve as a first operation restricting portion 54b and both sides of the notch 55b serve as a second operation restricting portion 55c. Then, as indicated by an imaginary line in FIG. 39, the trajectory of the first operation restricting portion 54b when the recliner interlocking prevention link 54 is pivoted and the trajectory of the second operation restricting portion 55c when the recliner drive gear 55R is pivoted are in a relationship of intersecting with each other. The lifter clutch pin 51L corresponds to the one transmission member in the disclosure, the recliner drive gear 55R corresponds to the other transmission member in the disclosure, and the recliner interlocking prevention link 54 corresponds to the connection member in the disclosure.

Figure 40:
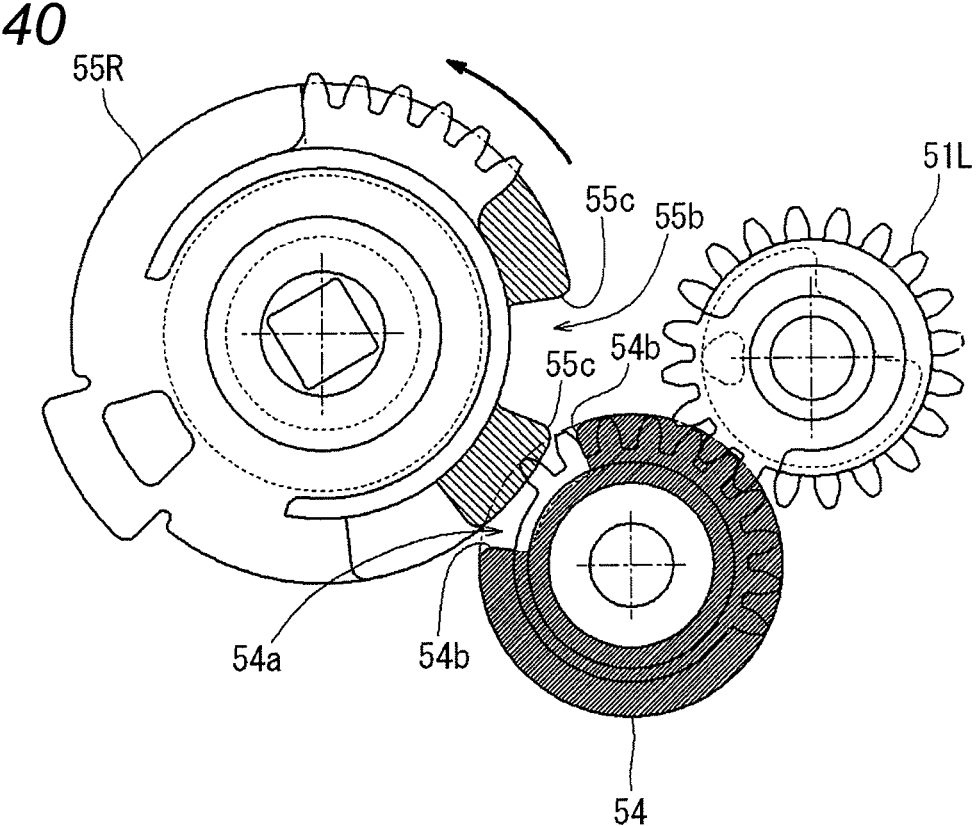
FIG. 40 is an enlarged front view similar to FIG. 39, showing a state in which the recliner drive gear is operated in one direction.
Figure 41:
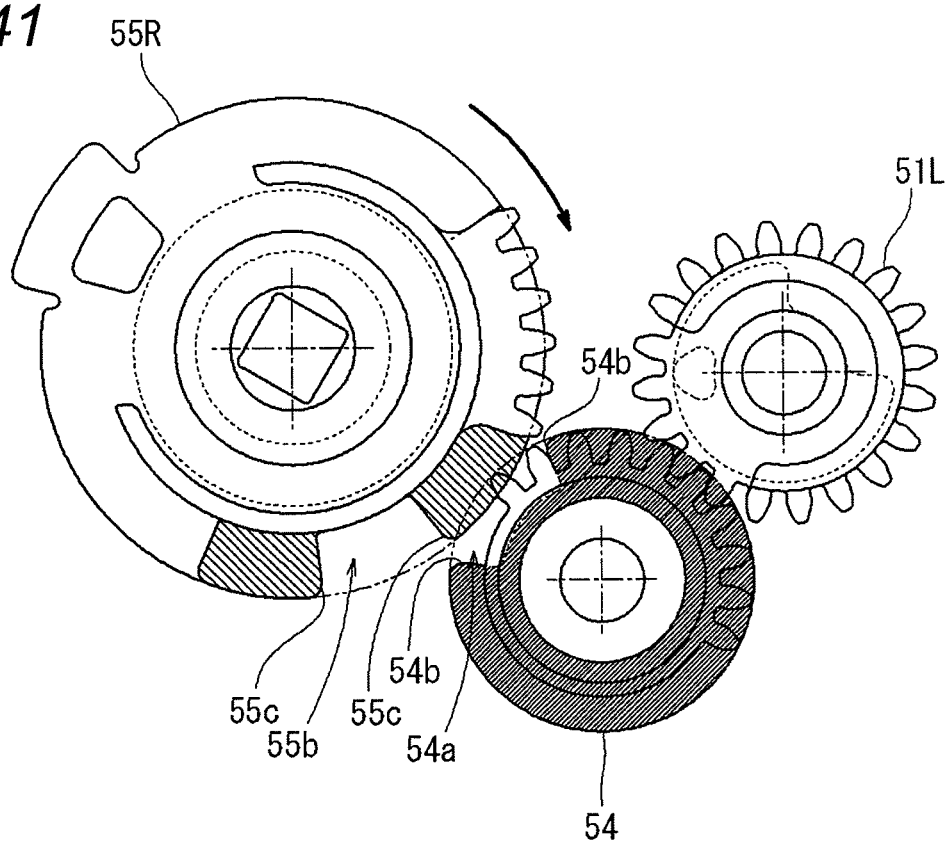
FIG. 41 is an enlarged front view similar to FIG. 39, showing a state in which the recliner drive gear is operated in the other direction.

FIG. 40 shows a state in which the recliner drive gear 55R is pivoted in the counter-clockwise direction as indicated by an arrow. In this state, the second operation restricting portion 55c of the recliner drive gear 55R intrudes into the notch 54a of the recliner interlocking prevention link 54. Therefore, in this state, the recliner interlocking prevention link 54 cannot be pivoted. Further, FIG. 41 shows a state in which the recliner drive gear 55R is pivoted in the clockwise direction as indicated by an arrow. In this state, the second operation restricting portion 55c of the recliner drive gear 55R intrudes into the notch 54a of the recliner interlocking prevention link 54. Therefore, in this state, the recliner interlocking prevention link 54 cannot be pivoted. In this way, in a state where the recliner operation knob 67 is operated to tilt and the recliner clutch pin 51R is pivoted, the lifter clutch pin 51L is prevented from being pivoted by operating the slide operation knob 66.

Figure 42:
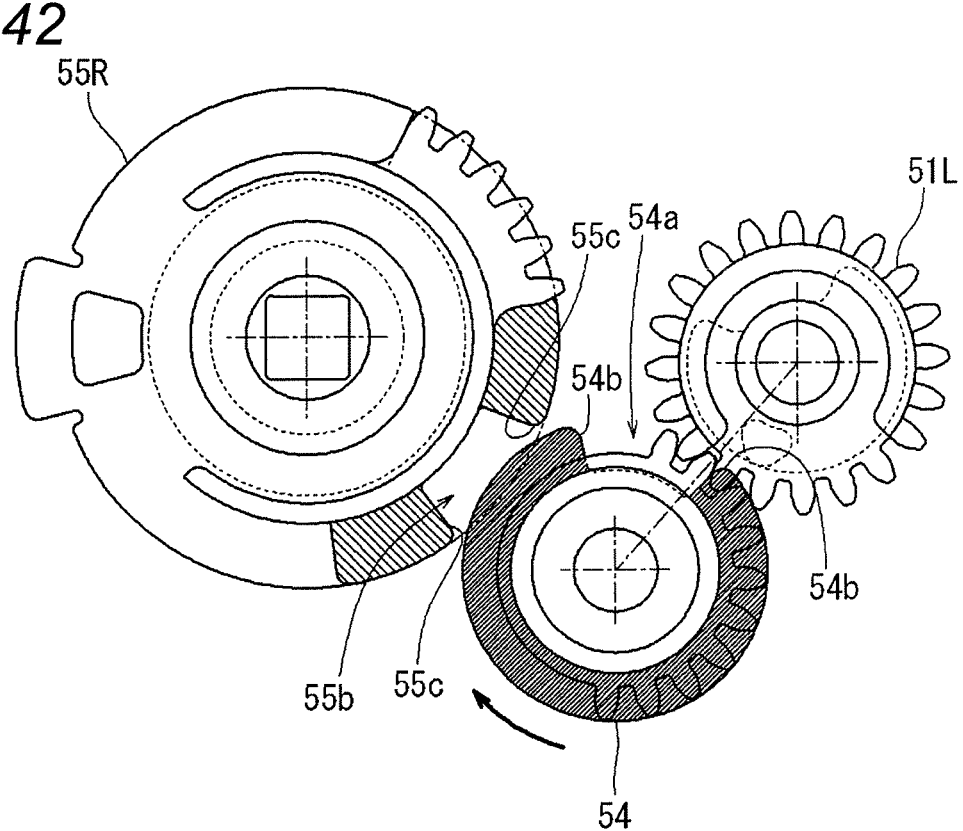
FIG. 42 is an enlarged front view similar to FIG. 39, showing a state in which the recliner clutch pin is operated in one direction.
Figure 43:
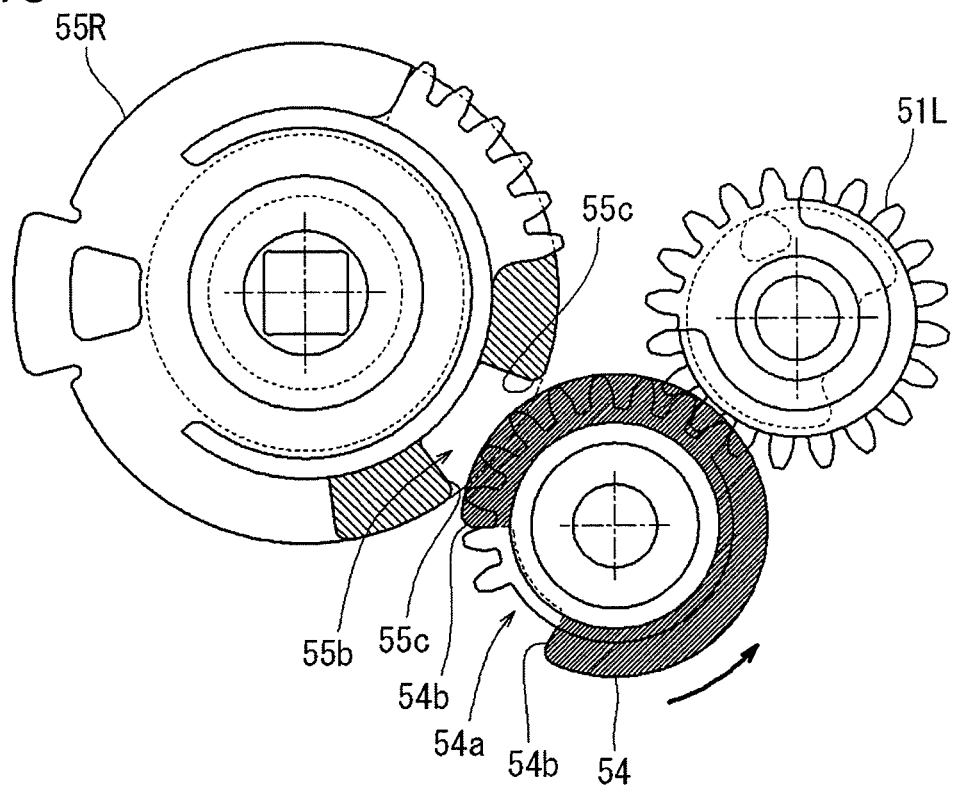
FIG. 43 is an enlarged front view similar to FIG. 39, showing a state in which the recliner clutch pin is operated in the other direction.

FIG. 42 shows a state in which the recliner interlocking prevention link 54 is pivoted in the clockwise direction as indicated by an arrow. In this state, the first operation restricting portion 54b of the recliner interlocking prevention link 54 intrudes into the notch 55b of the recliner drive gear 55R. Therefore, in this state, the recliner drive gear 55R cannot be pivoted. Further, FIG. 43 shows a state in which the recliner interlocking prevention link 54 is pivoted in the counter-clockwise direction as indicated by an arrow. In this state, the first operation restricting portion 54b of the recliner interlocking prevention link 54 intrudes into the notch 55b of the recliner drive gear 55R. Therefore, in this state, the recliner drive gear 55R cannot be pivoted. In this way, in a state where the slide operation knob 66 is operated and the lifter clutch pin 51L is pivoted, the tilting operation of the recliner operation knob 67 is prevented. Meanwhile, in FIGS. 39 to 43, hatching is given for the sake of convenience in order to easily identify the positions of the notches 54a, 55b.

FIG. 44 explains the function of the operating mechanism part in the first embodiment. That is, when the slide operation knob 66 is operated to slide back and forth, the slide link 62 is pivoted via the slide gear 64, and the switch link slide 57 is pivoted. As a result, the limit switch 59 is turned on and the drive motor 41 is actuated.

When the rear portion of the slide operation knob 66 is operated to move in the up and down direction, the lifter clutch pin 51L is pivoted via the lifter drive gear 55L and the lifter clutch mechanism 46L is brought into the connected state. Further, when the lifter clutch pin 51L is pivoted, the center cam 52 is pivoted, the sliding clutch pin 51S is also pivoted, and the sliding clutch mechanism 46S is brought into the non-connected state. Simultaneously, as the center cam 52 is pivoted, the limit switch 59 is turned on via the switch link normal 58, and the drive motor 41 is actuated.

When the front portion of the slide operation knob 66 is operated to move in the up and down direction, the tilting clutch pin 51T is pivoted via the tilting drive gear 55T, and the tilting clutch mechanism 46T is brought into the connected state. Further, when the tilting clutch pin 51T is pivoted, the center cam 52 is pivoted as described above, and accordingly, the sliding clutch mechanism 46S is brought into the non-connected state. Simultaneously, the limit switch 59 is turned on, and the drive motor 41 is actuated.

When the recliner operation knob 67 is operated to tilt, the recliner clutch pin 51R is pivoted via the recliner drive gear 55R, and the recliner clutch mechanism 46R is brought into the connected state. Further, when recliner clutch pin 51R is pivoted, the center cam 52 is pivoted as described above, and accordingly, the sliding clutch mechanism 46S is brought into the non-connected state. Simultaneously, the limit switch 59 is turned on, and the drive motor 41 is actuated.

The first and second operation restricting portions 62d, 52b, 52c, 52d are provided between the slide link 62 and the center cam 52. Only one of the slide link 62 and the center cam 52 is allowed to be pivoted, but both the slide link 62 and the center cam 52 are prevented from being simultaneously pivoted. Therefore, simultaneously with the sliding operation of the slide operation knob 66, the movement operation in the up and down direction of the front portion and the rear portion of the slide operation knob 66 and the titling operation of the recliner operation knob 67 cannot be performed.

The recliner interlocking prevention link 54 is disposed adjacent to the recliner drive gear 55R. The recliner interlocking prevention link 54 is configured to rotate in conjunction with the lifter clutch pin 51L. The first and second operation restricting portions 54b, 55c are provided between the recliner drive gear 55R and the recliner interlocking prevention link 54. Only one of the recliner drive gear 55R and the recliner interlocking prevention link 54 is allowed to be pivoted, but both the recliner drive gear 55R and the recliner interlocking prevention link 54 are prevented from being simultaneously pivoted. Therefore, simultaneously with the tilting operation of the recliner operation knob 67, the movement operation in the up and down direction of the rear portion of the slide operation knob 66 cannot be performed.

Although specific embodiments have been described above, the disclosure is not limited to the appearances and configurations in these embodiments, and various modifications, additions and deletions can be made without changing the spirit of the disclosure. For example, in the above embodiments, the first and second operation restricting portions between the center cam 52 and the slide link 62 are configured by combining the protrusions, and the first and second operation restricting portions between the recliner drive gear 55R and the recliner interlocking prevention link 54 are configured by using the notch. However, the first and second operation restricting portions between the center cam 52 and the slide link 62 may be configured by using the notch, and the first and second operation restricting portions between the recliner drive gear 55R and the recliner interlocking prevention link 54 may be configured by combining the protrusions.

In the above embodiments, the first and second operation restricting portion are provided between the recliner drive gear 55R and the recliner interlocking prevention link 54. However, instead of the recliner interlocking prevention link (corresponding to the connection member in the disclosure) 54, a lifter motion prevention link (corresponding to the connection member in the disclosure) rotating in conjunction with the recliner drive gear 55R may be provided, and the first and second operation restricting portions may be provided between the lifter motion prevention link and the lifter clutch pin 51L.

In the above embodiments, the first and second operation restricting portions are provided between the center cam 52 and the slide link 62. Here, the center cam 52 is interlocked with the recliner clutch pin 51R, the lifter clutch pin 51L and the tilting clutch pin 51T. However, the first and second operation restricting portions may be provided between an appropriate clutch pin of the clutch pins and the slide link 62.

In the above embodiments, the first and second operation restricting portions are provided adjacent to the notches. However, the first and second operation restricting portions may be configured by, for example, protrusions protruding toward an outer peripheral side of the recliner drive gear 55R without providing the notches.

In the above embodiments, the slide adjustment mechanism Ms, the lifter adjustment mechanism Ml, the tilt adjustment mechanism Mt and the reclining angle adjustment mechanism Mr are provided as the first and second position adjustment mechanisms. However, at least two arbitrary position adjustment mechanisms among those adjustment mechanisms or other position adjustment mechanisms of the seat moving portion may be combined.

In the above embodiments, the disclosure is applied to a vehicle seat. However, the disclosure may be applied to a seat mounted on an airplane, a ship, a train, and the like, or a seat installed indoors and outdoors.

The disclosure provides illustrative, non-limiting examples as follows:

According to a first aspect of the disclosure, there it provided a seat drive device including: a drive motor having a single output shaft; a first position adjustment mechanism configured to receive an output of the drive motor and adjust a position of a first moving portion among a plurality of seat moving portions; a second position adjustment mechanism configured to receive an output of the drive motor and adjust a position of a second moving portion among the plurality of seat moving portions; a first operation member disposed corresponding to the first position adjustment mechanism and configured to be operated to move from an original position to an adjustment position when actuating the first position adjustment mechanism; a second operation member disposed corresponding to the second position adjustment mechanism and configured to be operated to move from an original position to an adjustment position when actuating the second position adjustment mechanism; a first clutch mechanism disposed corresponding to the first position adjustment mechanism and configured to selectively connect an output shaft of the first clutch mechanism which is connected to the first position adjustment mechanism and an input shaft of the first clutch mechanism which is configured to be rotated by the drive motor; a second clutch mechanism disposed corresponding to the second position adjustment mechanism and configured to selectively connect an output shaft of the second clutch mechanism which is connected to the second position adjustment mechanism and an input shaft of the second clutch mechanism which is configured to be rotated by the drive motor; a switch configured to energize the drive motor with a polarity corresponding to an operation direction of the first operation member or the second operation member in accordance with the operation of the first operation member or the second operation member; a first transmission member configured to transmit an operating force so as to operate and move the first clutch mechanism or the switch in response to the first operation member being operated to move from the original position to the adjustment position; a second transmission member configured to transmit an operating force so as to operate and move the second clutch mechanism or the switch in response to the second operation member being operated to move from the original position to the adjustment position; a first operation restricting portion provided to the first transmission member and restricting the second operation member from being operated to move from the original position to the adjustment position in a state where the first operation member has been operated to move from the original position to the adjustment position and the first transmission member has been operated to move in response thereto; and a second operation restricting portion provided to the second transmission member and restricting the first operation member from being operated to move from the original position to the adjustment position in a state where the second operation member has been operated to move from the original position to the adjustment position and the second transmission member has been operated to move in response thereto.

According to the first aspect, in the state where the first operation member has been operated to move from the original position to the adjustment position, the first operation restricting portion of the first transmission member restricts the second transmission member from being operated to move from the original position to the adjustment position. Therefore, the second operation member cannot be operated from the original position to the adjustment position. Further, in the state where the second operation member has been operated to move from the original position to the adjustment position, the second operation restricting portion of the second transmission member restricts the first transmission member from being operated to move from the original position to the adjustment position. Therefore, the first operation member cannot be operated from the original position to the adjustment position. Thus, only one of the first operation member and the second operation member can be operated, but both of them cannot be operated simultaneously. As a result, it is possible to prevent a defect that a plurality of position adjustment mechanisms is simultaneously actuated by a single drive motor.

According to a second aspect of the disclosure there is provided the seat drive device according to the first aspect, wherein the first transmission member and the second transmission member are disposed adjacent to each other, wherein, when the first transmission member is operated to move, the first operation restricting portion becomes located within a movement range of the second operation restricting portion and restricts the second transmission member from being operated to move, and wherein, when the second transmission member is operated to move, the second operation restricting portion becomes located within a movement range of the first operation restricting portion and restricts the first transmission member from being operated to move.

In the second aspect, the first and second transmission members can be constituted by gears, links and the like. The first and second operation restricting portion can be constituted by protrusions, pins, levers and the like. Further, on outer surfaces of the first and second transmission members which have a positional relationship of being adjacent to each other and interfering with each other, notches are formed so as to avoid such interference. The first and second operation restricting portions can be provided at places on the outer surfaces adjacent to the notches.

According to the second aspect, when one of the first and second transmission members is operated, one of the first and second operation restricting portions provided to the one of the first and second transmission members is located within a partial movement range of the other of the first and second transmission members, and thus, the movement operation of the other of the first and second transmission members is restricted. Thus, only one of the first operation member and the second operation member can be operated, but both of them cannot be operated simultaneously. As a result, it is possible to prevent a defect that a plurality of position adjustment mechanisms is simultaneously actuated by a single drive motor.

According to a third aspect of the disclosure, there is provided the seat drive device according to the second aspect, wherein the first operation restricting portion is provided to protrude from an outer surface of the first transmission member in a direction intersecting a movement operation direction of the first transmission member, wherein the second operation restricting portion is provided to protrude from an outer surface of the second transmission member in a direction opposed to the first operation restricting portion, wherein the first operation restricting portion and the second operation restricting portion are arranged such that movement trajectories according to the first transmission member and the second transmission member being operated to move intersect with each other, wherein the first operation restricting portion and the second operation restricting portion do not interfere with each other when one of the first transmission member and the second transmission member is operated to move from a state in which both the first transmission member and the second transmission member has not been operated to move, and wherein the first operation restricting portion and the second operation restricting portion interfere with each other when another of the first transmission member and the second transmission member is operated to move from a state in which the one of the first transmission member and the second transmission member has been operated to move.

According to the third aspect, when one of the first transmission member and the second transmission member has been operated, one of the first and second operation restricting portions provided to protrude therefrom is located at a position intersecting with the moving trajectory of the other of the first and second operation restricting portions provided to protrude from the other of the first transmission member and the second transmission member. As a result, the movement operation of the other of the first and second transmission members is restricted. Therefore, even when both the first operation member and the second operation member are simultaneously operated, only the member which is operated earlier is operated to move and the movement operation of the member which is operated later is restricted. Thus, it is possible to prevent a defect that a plurality of position adjustment mechanisms is simultaneously actuated by a single drive motor.

According to a fourth aspect of the disclosure, there is provided the seat drive device according to the second aspect, wherein a first notch is formed on an outer surface of the first transmission member adjacent to the second transmission member, and the first operation restricting portion is provided adjacent to the first notch, wherein a second notch is formed on an outer surface of the second transmission member adjacent to the first transmission member, and the second operation restricting portion is provided adjacent to the second notch, wherein the first operation restricting portion and the second operation restricting portion are moved according to the first transmission member and the second transmission member being operated to move and are arranged so that their movement trajectories overlap with each other, wherein, when one of the first transmission member and the second transmission member is operated to move from a state in which both of the first transmission member and the second transmission member have not been operated to move, the first notch and the second notch are moved from a state of facing each other and one of the first operation restricting portion and the second operation restricting portion does not interfere with the other of the first operation restricting portion and the second operation restricting portion due to either of the first notch and the second notch which is provided adjacent to the other of the first operation restricting portion and the second operation restricting portion, and wherein, when another of the first transmission member and the second transmission member is operated to move from a state in which one of the first transmission member and the second transmission member has been operated to move, the first operation restricting portion and the second operation restricting portion are arranged to interfere with each other.

According to the fourth aspect, in a state in which both of the transmission members have not been operated to move, both notches are positioned to face each other. Therefore, one of both operation members can be operated to move. In a state in which one of both transmission members has been operated to move, one of both notches is positioned to be deviated from the other. Therefore, when one of both operation members, which has not been operated to move, is operated to move, both operation restricting portions interfere with each other. In this way, only one of the first operation member and the second operation member can be operated, but both of them cannot be operated simultaneously. As a result, it is possible to prevent a defect that a plurality of position adjustment mechanisms is simultaneously actuated by a single drive motor.

According to a fifth aspect of the disclosure, there is provided the seat drive device according to the first aspect, further including: a connection member provided between the first transmission member and the second transmission member, coupled to one of the first transmission member and the second transmission member so as to be operated to move by receiving an operating force from the one of the first transmission member and the second transmission member, and disposed adjacent to another of the first transmission member and the second transmission member, wherein the first operation restricting portion is provided to the connection member and restricts another of the first operation member and the second operational member from being operated to move from the original position to the adjustment position in a state where one of the first operation member and the second operation member has been operated to move from the original position to the adjustment position and the one of the first transmission member and the second transmission member has been operated to move in response thereto, and wherein the second operation restricting portion is provided to the other of the first transmission member and the second transmission member and restricts the one of the first operation member and the second operation member from being operated to move from the original position to the adjustment position in a state where the other of the first operation member and the second operation member has been operated to move from the original position to the adjustment position and the other of the first transmission member and the second transmission member has been operated to move in response thereto.

In the fifth aspect, the first and second operation restricting portions can be configured by protrusions, pins, levers and the like. Further, on outer surfaces of the first and second transmission members which have a positional relationship of being adjacent to each other and interfering with each other, notches are formed so as to avoid such interference. The first and second operation restricting portions can be provided at places on the outer surfaces adjacent to the notches.

According to the fifth aspect, the first operation restricting portion is provided to the connection member coupled to one of both transmission members, and the second operation restricting portion is provided to the other of both transmission members. Therefore, even when it is difficult to arrange both transmission members adjacently, it is possible to realize a configuration in which the operation of the other of the first operation member and the second operation member is restricted when one of the first operation member and the second operation member is operated.

According to a sixth aspect of the disclosure, there is provided the seat drive device according to the fifth aspect, wherein a first notch is formed on an outer surface of the connection member which is adjacent to the other of the first transmission member and the second transmission member, and the first operation restricting portion is provided adjacent to the first notch, wherein a second notch is formed on an outer surface of the other of the first transmission member and the second transmission member which is adjacent to the connection member, and the second operation restricting portion is provided adjacent to the second notch, wherein the first operation restricting portion and the second operation restricting portion are moved according to the connection member and the other of the first transmission member and the second transmission member being operated to move and are arranged so that their movement trajectories overlap with each other, wherein, when one of the first transmission member and the second transmission member is operated to move from a state in which both of the first transmission member and the second transmission member have not been operated to move, the first notch and the second notch are moved from a state of facing each other and one of the first operation restricting portion and the second operation restricting portion does not interfere with the other of the first operation restricting portion and the second operation restricting portion due to either of the first notch and the second notch which is provided adjacent to the other of the first operation restricting portion and the second operation restricting portion, and wherein, when another of the first transmission member and the second transmission member is operated to move from a state in which one of the first transmission members and the second transmission member has been operated to move, the first operation restricting portion and the second operation restricting portion are arranged to interfere with each other.

According to the sixth aspect, in a state in which both of the transmission members has not been operated to move, both notches are positioned to face each other. Therefore, one of both operation members can be operated to move. In a state in which one of both transmission members has been operated to move, one of both notches is positioned to be deviated from the other. Therefore, when one of both operation members, which has not been operated to move, is operated to move, both operation restricting portions interfere with each other. In this way, only one of both operation members can be operated, but both of them cannot be operated simultaneously. As a result, it is possible to prevent a defect that a plurality of position adjustment mechanisms is simultaneously actuated by a single drive motor.

According to a seventh aspect of the disclosure, there is provided the seat drive device according to the first or second aspect, wherein the first position adjustment mechanism is a slide adjustment mechanism configured to adjust a position in a front and rear direction of the seat to a floor, wherein the second position adjustment mechanism is a tilt adjustment mechanism configured to adjust a height of a front side portion to a rear side portion of a seat cushion or a lifter adjustment mechanism configured to adjust a height of the seat from the floor, and wherein both the first operation member and the second operation member are operated by a single operation knob and are operated independently of each other due to a difference in operation direction with respect to the operation knob.

When the first position adjustment mechanism and a plurality of adjustment mechanisms included in the second position adjustment mechanism are operated by a single operation knob, there is a possibility that a plurality of adjustment mechanisms is simultaneously operated in contradiction to the intention of an operator. According to the seventh aspect, the first operation restricting portion and the second operation restricting portion can prevent a plurality of adjustment mechanism from being simultaneously operated.

According to an eighth aspect of the disclosure, there is provided the seat drive device according to the first or second aspect, wherein the first position adjustment mechanism is a slide adjustment mechanism configured to adjust a position in a front and rear direction of the seat to a floor, wherein the second position adjustment mechanism is a tilt adjustment mechanism configured to adjust a height of a front side portion to a rear side portion of a seat cushion, a lifter adjustment mechanism configured to adjust a height of the seat from the floor, or a reclining angle adjustment mechanism configured to adjust an inclination angle of a seat back to the seat cushion, wherein the first operation member and the second operation member are operated to move similarly to an adjustment operation of the seat cushion or the seat back by the first position adjustment mechanism and the second position adjustment mechanism, and wherein the first transmission member and the second transmission member are rotation members that are rotated in accordance with the conversion of the movement operation of the first operation member and the second operation member into a rotational motion.

According to the eighth aspect, both of the first transmission member and the second transmission member are configured by rotation members. Therefore, the first operation restricting portion and the second operation restricting portion can be configured between the rotation members, and thus, the sizes of the first operation restricting portion and the second operation restricting portion can be reduced.

According to a ninth aspect of the disclosure, there is provided the seat drive device according to the eighth aspect, wherein the rotation members forming the first transmission member and the second transmission member are disposed so that their surfaces orthogonal to their rotation axes overlap with each other, and wherein the first operation restricting portion and the second operation restricting portion are provided between the surfaces of the first rotation member and the second rotation member which overlap with each other.

According to the ninth aspect, the first operation restricting portion and the second operation restricting portion are provided between the overlapping surfaces of the rotation members. Therefore, it is possible to configure the first operation restricting portion and the second operation restricting portion without increasing the size in a direction orthogonal to the rotation axes of the rotation members.

According to a tenth aspect of the disclosure, there is provided a seat drive device provided in a seat including a plurality of position adjustment mechanisms including a first position adjustment mechanism and a plurality of second position adjustment mechanisms, the seat drive device including: a drive motor having a single output shaft; a plurality of operation members individually disposed corresponding to the plurality of position adjustment mechanisms and configured to be operated when actuating the plurality of position adjustment mechanisms, respectively, the plurality of operation members including: a first operation member configured to be operated to move from an original position to an adjustment position when actuating the first position adjustment mechanism; and a plurality of second operation members configured to be individually operated to move from an original position to an adjustment position when actuating the plurality of second position adjustment mechanisms, respectively; a plurality of clutch mechanisms individually disposed corresponding to the plurality of position adjustment mechanisms and configured to selectively connect each output shaft of the plurality of clutch mechanisms which is connected to each of the plurality of position adjustment mechanisms and each input shaft of the plurality of clutch mechanisms which is configured to be rotated by the drive motor, the plurality of clutch mechanisms including: a first clutch mechanism connected to the first position adjustment mechanism and causing the output shaft of the first clutch mechanism which is connected to the first position adjustment mechanism and the input shaft of the first clutch mechanism to be normally in a connected state; and a plurality of second clutch mechanisms respectively connected to the plurality of second position adjustment mechanisms and causing each output shaft of the plurality of second clutch mechanisms which is connected to each of the plurality of second position adjustment mechanisms and each input shaft of the plurality of second clutch mechanisms to be normally in a non-connected state; a switch configured to energize the drive motor with a polarity corresponding to an operation direction of any one of the plurality of operation members in accordance with the operation of the any one of the plurality of operation members, a first clutch driving unit for switching the output shaft and the input shaft of the first clutch mechanism to a non-connected state; a plurality of second clutch driving unit for individually switching each output shaft and each input shaft of each of the plurality of second clutch mechanisms to a connected state; a cooperating member configured to transmit an operating force of operating each of the plurality of second operation members, which has been transmitted to each of the plurality of second clutch driving unit, to the first clutch driving unit; a transmission member configured to transmit an operating force so as to operate and move the switch in accordance with the first operation member being operated to move from the original position to the adjustment position; a first operation restricting portion provided to the transmission member and restricting any one of the second operation members from being operated to move from the original position to the adjustment position in a state where the first operation member has been operated to move from the original position to the adjustment position and the transmission member has been operated to move in response thereto; and a second operation restricting portion provided to the cooperating member and restricting the first operation member from being operated to move from the original position to the adjustment position in a state where the second operation member has been operated to move from the original position to the adjustment position and the cooperating member has been operated to move in response thereto.

According to the tenth aspect, when one of the first and second operation members is operated, one of the first and second operation restricting portions provided to the cooperating member or the transmission member restricts the operation of the other of the cooperating member and the transmission member. Therefore, it is possible to prevent a defect that a plurality of position adjustment mechanisms is simultaneously actuated by a single drive motor. Moreover, since the second operation restricting portion is provided to the cooperating member, the operations of the plurality of second operation members can be restricted by a single second operation restricting portion.

According to an eleventh aspect of the disclosure, there is provided the seat drive device according to the tenth aspect, wherein the first operation restricting portion is provided to protrude from an outer surface of the transmission member in a direction intersecting a movement operation direction of the transmission member, wherein the second operation restricting portion is provided to protrude from an outer surface of the cooperating member in a direction opposed to the first operation restricting portion, wherein the first operation restricting portion and the second operation restricting portion are arranged such that movement trajectories according to the transmission member and the cooperating member being operated to move intersect with each other, wherein the first operation restricting portion and the second operation restricting portion do not interfere with each other when one of the transmission member and the cooperating member is operated to move from a state in which both the transmission member and the cooperating member has not been operated to move, and wherein the first operation restricting portion and the second operation restricting portion interfere with each other when another of the transmission member and the cooperating member is operated to move from a state in which the one of the transmission member and the cooperating member has been operated to move.

According to the eleventh aspect, when one of the transmission member and the cooperating member has been operated, one of the first and second operation restricting portions provided to protrude therefrom is located at a position intersecting with the moving trajectory of the other of the first and second operation restricting portions provided to protrude from the other of the transmission member and the cooperating member. As a result, the movement operation of the other of the transmission member and the cooperating member. Therefore, even when both the first operation member and the second operation member are simultaneously operated, only the member which is operated earlier is operated to move and the movement operation of the member which is operated later is restricted. Thus, it is possible to prevent a defect that a plurality of position adjustment mechanisms is simultaneously actuated by a single drive motor.

According to a twelfth aspect of the disclosure, there is provided a seat drive device including: a drive motor having a single output shaft; a lifter adjustment mechanism configured to receive an output of the drive motor and adjusting a height of a seat from a floor; a reclining angle adjustment mechanism configured to receive an output of the drive motor and adjust an inclination angle of a seat back to a seat cushion; a first operation knob disposed corresponding to the lifter adjustment mechanism and configured to be operated to move from an original position to an adjustment position when actuating the lifter adjustment mechanism; a second operation knob disposed corresponding to the reclining angle adjustment mechanism and configured to be operated to move from an original position to an adjustment position when actuating the reclining angle adjustment mechanism; a lifter clutch mechanism disposed corresponding to the lifter adjustment mechanism and configured to selectively connect an output shaft of the lifter clutch mechanism which is connected to the lifter adjustment mechanism and an input shaft of the first clutch mechanism which is configured to be rotated by the drive motor; a recliner clutch mechanism disposed corresponding to the reclining angle adjustment mechanism and configured to selectively connect an output shaft of the recliner clutch mechanism which is connected to the reclining angle adjustment mechanism and an input shaft of the recliner clutch mechanism which is configured to be rotated by the drive motor; a switch configured to energize the drive motor with a polarity corresponding to an operation direction of the first operation knob or the second operation knob in accordance with the operation of the first operation knob or the second operation knob; a first transmission member configured to transmit an operating force so as to operate and move the lifter clutch mechanism or the switch in response to the first operation knob being operated to move from the original position to the adjustment position; a second transmission member configured to transmit an operating force so as to operate and move the recliner clutch mechanism or the switch in response to the second operation knob being operated to move from the original position to the adjustment position; a first operation restricting portion provided to the first transmission member and restricting the second operation knob from being operated to move from the original position to the adjustment position in a state where the first operation knob has been operated to move from the original position to the adjustment position and the first transmission member has been operated to move in response thereto; and a second operation restricting portion provided to the second transmission member and restricting the first operation knob from being operated to move from the original position to the adjustment position in a state where the second operation knob has been operated to move from the original position to the adjustment position and the second transmission member has been operated to move in response thereto, wherein the first operation knob and the second operation knob are disposed adjacent to each other.

When the first operation knob and the second operation knob are arranged adjacent to each other, the possibility that both of the operation knobs are simultaneously operated is increased. According to the twelfth aspect, the simultaneous operation of the first operation knob and the second operation knob is prevented by the first operation restricting portion and the second operation restricting portion. Therefore, it is possible to increase the degree of freedom in arrangement of the first operation knob and the second operation knob.

What is claimed is:
1. A seat drive device comprising:
a drive motor having a single output shaft;
a first position adjustment mechanism configured to receive an output of the drive motor and adjust a position of a first moving portion among a plurality of seat moving portions;
a second position adjustment mechanism configured to receive an output of the drive motor and adjust a position of a second moving portion among the plurality of seat moving portions;
a first operation member disposed corresponding to the first position adjustment mechanism and configured to be operated to move from an original position to an adjustment position when actuating the first position adjustment mechanism;
a second operation member disposed corresponding to the second position adjustment mechanism and configured to be operated to move from an original position to an adjustment position when actuating the second position adjustment mechanism;

a first clutch mechanism disposed corresponding to the first position adjustment mechanism and configured to selectively connect an output shaft of the first clutch mechanism which is connected to the first position adjustment mechanism and an input shaft of the first clutch mechanism which is configured to be rotated by the drive motor;

a second clutch mechanism disposed corresponding to the second position adjustment mechanism and configured to selectively connect an output shaft of the second clutch mechanism which is connected to the second position adjustment mechanism and an input shaft of the second clutch mechanism which is configured to be rotated by the drive motor;

a switch configured to energize the drive motor with a polarity corresponding to an operation direction of the first operation member or the second operation member in accordance with the operation of the first operation member or the second operation member;

a first transmission member configured to transmit an operating force so as to operate and move the first clutch mechanism or the switch in response to the first operation member being operated to move from the original position to the adjustment position;

a second transmission member configured to transmit an operating force so as to operate and move the second clutch mechanism or the switch in response to the second operation member being operated to move from the original position to the adjustment position;

a first operation restricting portion provided to the first transmission member and restricting the second operation member from being operated to move from the original position to the adjustment position in a state where the first operation member has been operated to move from the original position to the adjustment position and the first transmission member has been operated to move in response to the first operation member having been operated to move from the original position to the adjustment position; and a second operation restricting portion provided to the second transmission member and restricting the first operation member from being operated to move from the original position to the adjustment position in a state where the second operation member has been operated to move from the original position to the adjustment position and the second transmission member has been operated to move in response to the second operation member having been operated to move from the original position to the adjustment position.

2. The seat drive device according to claim 1,
wherein the first transmission member and the second transmission member are disposed adjacent to each other,
wherein, when the first transmission member is operated to move, the first operation restricting portion becomes located within a movement range of the second operation restricting portion and restricts the second transmission member from being operated to move, and
wherein, when the second transmission member is operated to move, the second operation restricting portion becomes located within a movement range of the first operation restricting portion and restricts the first transmission member from being operated to move.

3. The seat drive device according to claim 2,
wherein the first operation restricting portion is provided to protrude from an outer surface of the first transmission member in a direction intersecting a movement operation direction of the first transmission member,
wherein the second operation restricting portion is provided to protrude from an outer surface of the second transmission member in a direction opposed to the first operation restricting portion,
wherein the first operation restricting portion and the second operation restricting portion are arranged such that movement trajectories according to the first transmission member and the second transmission member being operated to move intersect with each other,
wherein the first operation restricting portion and the second operation restricting portion do not interfere with each other when one of the first transmission member and the second transmission member is operated to move from a state in which both the first transmission member and the second transmission member has not been operated to move, and
wherein the first operation restricting portion and the second operation restricting portion interfere with each other when another of the first transmission member and the second transmission member is operated to move from a state in which the one of the first transmission member and the second transmission member has been operated to move.

4. The seat drive device according to claim 2,
wherein a first notch is formed on an outer surface of the first transmission member adjacent to the second transmission member, and the first operation restricting portion is provided adjacent to the first notch,
wherein a second notch is formed on an outer surface of the second transmission member adjacent to the first transmission member, and the second operation restricting portion is provided adjacent to the second notch,
wherein the first operation restricting portion and the second operation restricting portion are moved according to the first transmission member and the second transmission member being operated to move and are arranged so that their movement trajectories overlap with each other,
wherein, when one of the first transmission member and the second transmission member is operated to move from a state in which both of the first transmission member and the second transmission member have not been operated to move, the first notch and the second notch are moved from a state of facing each other and one of the first operation restricting portion and the second operation restricting portion does not interfere with the other of the first operation restricting portion and the second operation restricting portion due to either of the first notch and the second notch which is provided adjacent to the other of the first operation restricting portion and the second operation restricting portion, and
wherein, when another of the first transmission member and the second transmission member is operated to move from a state in which one of the first transmission member and the second transmission member has been operated to move, the first operation restricting portion and the second operation restricting portion are arranged to interfere with each other.

5. The seat drive device according to claim 1, further comprising:
a connection member provided between the first transmission member and the second transmission member, coupled to one of the first transmission member and the second transmission member so as to be operated to move by receiving an operating force from the one of the first transmission member and the second transmission member, and disposed adjacent to another of the first transmission member and the second transmission member, wherein the first operation restricting portion is provided to the connection member and restricts another of the first operation member and the second operation member from being operated to move from the original position to the adjustment position in a state where one of the first operation member and the second operation member has been operated to move from the original position to the adjustment position and the one of the first transmission member and the second transmission member has been operated to move in response the one of the first operation member and the second operation member having been operated to move from the original position to the adjustment position, and wherein the second operation restricting portion is provided to the other of the first transmission member and the second transmission member and restricts the one of the first operation member and the second operation member from being operated to move from the original position to the adjustment position in a state where the other of the first operation member and the second operation member has been operated to move from the original position to the adjustment position and the other of the first transmission member and the second transmission member has been operated to move in response to the other of the first operation member and the second operation member having been operated to move from the original position to the adjustment position.

6. The seat drive device according to claim 5, wherein a first notch is formed on an outer surface of the connection member which is adjacent to the other of the first transmission member and the second transmission member, and the first operation restricting portion is provided adjacent to the first notch, wherein a second notch is formed on an outer surface of the other of the first transmission member and the second transmission member which is adjacent to the connection member, and the second operation restricting portion is provided adjacent to the second notch, wherein the first operation restricting portion and the second operation restricting portion are moved according to the connection member and the other of the first transmission member and the second transmission member being operated to move and are arranged so that their movement trajectories overlap with each other, wherein, when one of the first transmission member and the second transmission member is operated to move from a state in which both of the first transmission member and the second transmission member have not been operated to move, the first notch and the second notch are moved from a state of facing each other and one of the first operation restricting portion and the second operation restricting portion does not interfere with the other of the first operation restricting portion and the second operation restricting portion due to either of the first notch and the second notch which is provided adjacent to the other of the first operation restricting portion and the second operation restricting portion, and wherein, when another of the first transmission member and the second transmission member is operated to move from a state in which one of the first transmission members and the second transmission member has been operated to move, the first operation restricting portion and the second operation restricting portion are arranged to interfere with each other.

7. The seat drive device according to claim 1, wherein the first position adjustment mechanism is a slide adjustment mechanism configured to adjust a position in a front and rear direction of the seat to a floor, wherein the second position adjustment mechanism is a tilt adjustment mechanism configured to adjust a height of a front side portion to a rear side portion of a seat cushion or a lifter adjustment mechanism configured to adjust a height of the seat from the floor, and wherein both the first operation member and the second operation member are operated by a single operation knob and are operated independently of each other due to a difference in operation direction with respect to the operation knob.

8. The seat drive device according to claim 1, wherein the first position adjustment mechanism is a slide adjustment mechanism configured to adjust a position in a front and rear direction of the seat to a floor, wherein the second position adjustment mechanism is a tilt adjustment mechanism configured to adjust a height of a front side portion to a rear side portion of a seat cushion, a lifter adjustment mechanism configured to adjust a height of the seat from the floor, or a reclining angle adjustment mechanism configured to adjust an inclination angle of a seat back to the seat cushion, wherein the first operation member and the second operation member are operated to move similarly to an adjustment operation of the seat cushion or the seat back by the first position adjustment mechanism and the second position adjustment mechanism, and wherein the first transmission member and the second transmission member are rotation members that are rotated in accordance with the conversion of the movement operation of the first operation member and the second operation member into a rotational motion.

9. The seat drive device according to claim 8, wherein the rotation members forming the first transmission member and the second transmission member are disposed so that their surfaces orthogonal to their rotation axes overlap with each other, and wherein the first operation restricting portion and the second operation restricting portion are provided between the surfaces of the first rotation member and the second rotation member which overlap with each other.

10. A seat drive device provided in a seat including a plurality of position adjustment mechanisms including a first position adjustment mechanism and a plurality of second position adjustment mechanisms, the seat drive device comprising:

a drive motor having a single output shaft;

a plurality of operation members individually disposed corresponding to the plurality of position adjustment mechanisms and configured to be operated when actuating the plurality of position adjustment mechanisms, respectively, the plurality of operation members including: a first operation member configured to be operated to move from an original position to an adjustment position when actuating the first position adjustment mechanism; and a plurality of second operation members configured to be individually operated to move from an original position to an adjustment position when actuating the plurality of second position adjustment mechanisms, respectively;

a plurality of clutch mechanisms individually disposed corresponding to the plurality of position adjustment mechanisms and configured to selectively connect each output shaft of the plurality of clutch mechanisms which is connected to each of the plurality of position adjustment mechanisms and each input shaft of the plurality of clutch mechanisms which is configured to be rotated by the drive motor, the plurality of clutch mechanisms including: a first clutch mechanism connected to the first position adjustment mechanism and causing the output shaft of the first clutch mechanism which is connected to the first position adjustment mechanism and the input shaft of the first clutch mechanism to be normally in a connected state; and a plurality of second clutch mechanisms respectively connected to the plurality of second position adjustment mechanisms and causing each output shaft of the plurality of second clutch mechanisms which is connected to each of the plurality of second position adjustment mechanisms and each input shaft of the plurality of second clutch mechanisms to be normally in a non-connected state;

a switch configured to energize the drive motor with a polarity corresponding to an operation direction of any one of the plurality of operation members in accordance with the operation of the any one of the plurality of operation members;

a first clutch driving unit for switching the output shaft and the input shaft of the first clutch mechanism to a non-connected state;

a plurality of second clutch driving units for individually switching each output shaft and each input shaft of each of the plurality of second clutch mechanisms to a connected state;

a cooperating member configured to transmit an operating force of operating each of the plurality of second operation members, which has been transmitted to each of the plurality of second clutch driving unit, to the first clutch driving unit;

a transmission member configured to transmit an operating force so as to operate and move the switch in accordance with the first operation member being operated to move from the original position to the adjustment position;

a first operation restricting portion provided to the transmission member and restricting any one of the second operation members from being operated to move from the original position to the adjustment position in a state where the first operation member has been operated to move from the original position to the adjustment position and the transmission member has been operated to move in response to the first operation member having been operated to move from the original position to the adjustment position; and a second operation restricting portion provided to the cooperating member and restricting the first operation member from being operated to move from the original position to the adjustment position in a state where the second operation member has been operated to move from the original position to the adjustment position and the cooperating member has been operated to move in response to the second operation member having been operated to move from the original position to the adjustment position.

11. The seat drive device according to claim 10,
wherein the first operation restricting portion is provided to protrude from an outer surface of the transmission member in a direction intersecting a movement operation direction of the transmission member,
wherein the second operation restricting portion is provided to protrude from an outer surface of the cooperating member in a direction opposed to the first operation restricting portion,
wherein the first operation restricting portion and the second operation restricting portion are arranged such that movement trajectories according to the transmission member and the cooperating member being operated to move intersect with each other,
wherein the first operation restricting portion and the second operation restricting portion do not interfere with each other when one of the transmission member and the cooperating member is operated to move from a state in which both the transmission member and the cooperating member has not been operated to move, and
wherein the first operation restricting portion and the second operation restricting portion interfere with each other when another of the transmission member and the cooperating member is operated to move from a state in which the one of the transmission member and the cooperating member has been operated to move.

12. A seat drive device comprising:
a drive motor having a single output shaft;
a lifter adjustment mechanism configured to receive an output of the drive motor and adjusting a height of a seat from a floor;
a reclining angle adjustment mechanism configured to receive an output of the drive motor and adjust an inclination angle of a seat back to a seat cushion;
a first operation knob disposed corresponding to the lifter adjustment mechanism and configured to be operated to move from an original position to an adjustment position when actuating the lifter adjustment mechanism;
a second operation knob disposed corresponding to the reclining angle adjustment mechanism and configured to be operated to move from an original position to an adjustment position when actuating the reclining angle adjustment mechanism;
a lifter clutch mechanism disposed corresponding to the lifter adjustment mechanism and configured to selectively connect an output shaft of the lifter clutch mechanism which is connected to the lifter adjustment mechanism and an input shaft of the first clutch mechanism which is configured to be rotated by the drive motor;
a recliner clutch mechanism disposed corresponding to the reclining angle adjustment mechanism and configured to selectively connect an output shaft of the recliner clutch mechanism which is connected to the reclining angle adjustment mechanism and an input shaft of the recliner clutch mechanism which is configured to be rotated by the drive motor;
a switch configured to energize the drive motor with a polarity corresponding to an operation direction of the first operation knob or the second operation knob in accordance with the operation of the first operation knob or the second operation knob;

a first transmission member configured to transmit an operating force so as to operate and move the lifter clutch mechanism or the switch in response to the first operation knob being operated to move from the original position to the adjustment position;

a second transmission member configured to transmit an operating force so as to operate and move the recliner clutch mechanism or the switch in response to the second operation knob being operated to move from the original position to the adjustment position;

a first operation restricting portion provided to the first transmission member and restricting the second operation knob from being operated to move from the original position to the adjustment position in a state where the first operation knob has been operated to move from the original position to the adjustment position and the first transmission member has been operated to move in response to the first operation knob having been operated to move from the original position to the adjustment position; and a second operation restricting portion provided to the second transmission member and restricting the first operation knob from being operated to move from the original position to the adjustment position in a state where the second operation knob has been operated to move from the original position to the adjustment position and the second transmission member has been operated to move in response to the second operation knob having been operated to move from the original position to the adjustment position, wherein the first operation knob and the second operation knob are disposed adjacent to each other.

* * * * *